(12) United States Patent
Breidenbach

(10) Patent No.: US 9,545,961 B2
(45) Date of Patent: Jan. 17, 2017

(54) AERODYNAMIC DRAG REDUCING APPARATUS

(71) Applicant: Thomas Scott Breidenbach, Maple Grove, MN (US)

(72) Inventor: Thomas Scott Breidenbach, Maple Grove, MN (US)

( * ) Notice: Subject to any disclaimer, the term of this patent is extended or adjusted under 35 U.S.C. 154(b) by 0 days.

(21) Appl. No.: 14/748,645

(22) Filed: Jun. 24, 2015

(65) Prior Publication Data

US 2016/0167720 A1   Jun. 16, 2016

Related U.S. Application Data

(63) Continuation of application No. 14/262,990, filed on Apr. 28, 2014, now abandoned, which is a continuation of application No. 13/367,024, filed on Feb. 6, 2012, now Pat. No. 8,708,398, which is a continuation of application No. 12/962,040, filed on Dec. 7, 2010, now abandoned, which is a continuation of application No. 12/134,348, filed on Jun. 6, 2008, now Pat. No. 7,854,708.

(60) Provisional application No. 61/029,922, filed on Feb. 21, 2008, provisional application No. 60/942,457, filed on Jun. 6, 2007.

(51) Int. Cl.
*B62D 37/02* (2006.01)
*B62D 35/00* (2006.01)

(52) U.S. Cl.
CPC ............ *B62D 35/001* (2013.01); *B62D 35/00* (2013.01); *B62D 35/007* (2013.01)

(58) Field of Classification Search
CPC ...... B62D 35/001; B62D 35/007; B62D 35/00
See application file for complete search history.

(56) References Cited

U.S. PATENT DOCUMENTS

| 1,352,679 A | * | 9/1920 | Myers | ................... B62D 35/00 |
| | | | | 180/89.11 |
| 3,711,146 A | * | 1/1973 | Madzsar | ............. B62D 35/001 |
| | | | | 105/17 |

* cited by examiner

*Primary Examiner* — Lori L Lyjak
(74) *Attorney, Agent, or Firm* — Merchant & Gould P.C.

(57) ABSTRACT

An aerodynamic drag reducing apparatus is provided for use with vehicles having surfaces that are not streamlined. The apparatus including an exterior cover supported by moveable frames which in turn are supported by sets of supporting linkages. The moveable frames extend rearward and together with the exterior cover form a drag reducing shape for use in a drag reducing configuration and collapse for use in a space saving configuration.

20 Claims, 40 Drawing Sheets

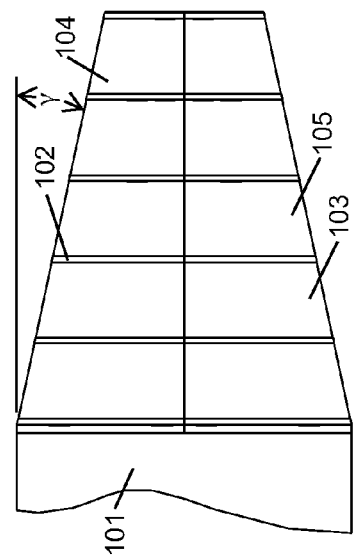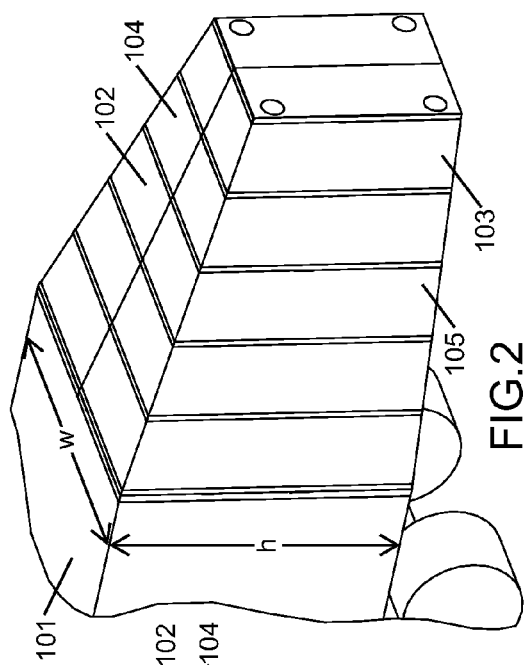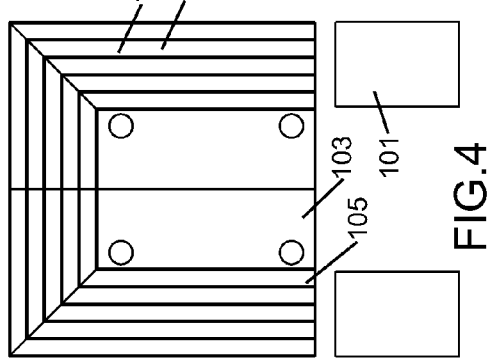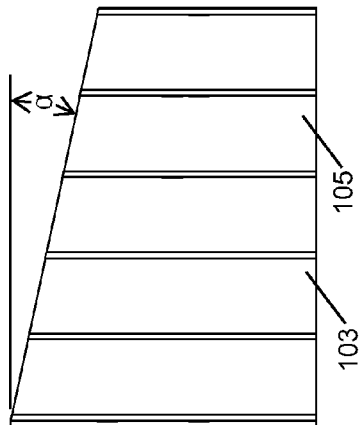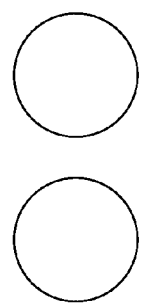
FIG.1 FIG.2 FIG.3 FIG.4

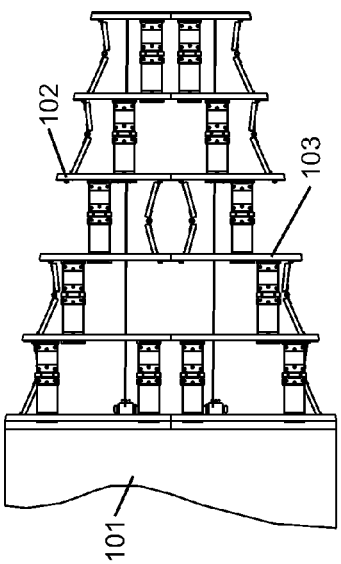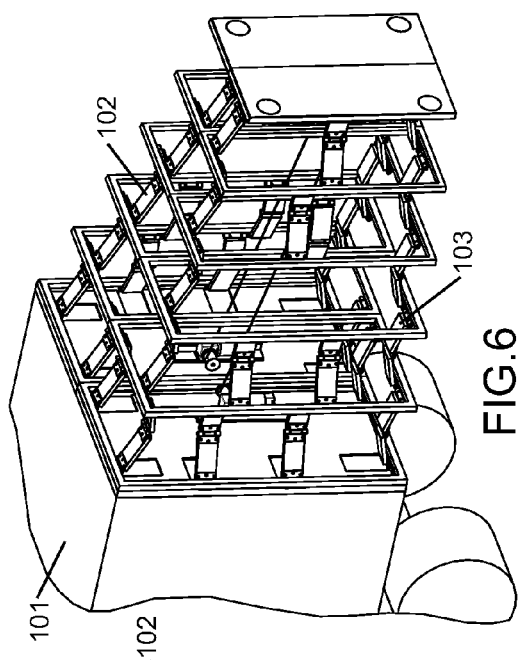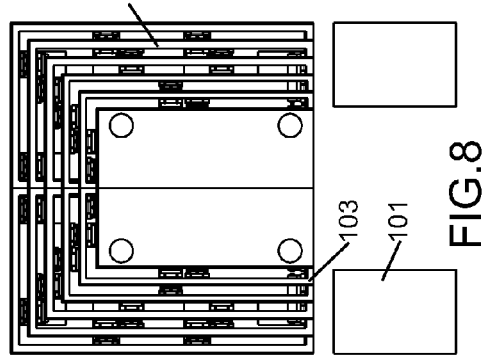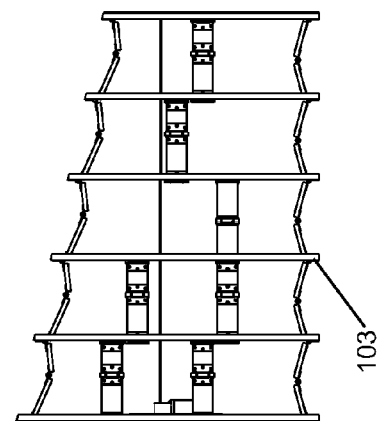

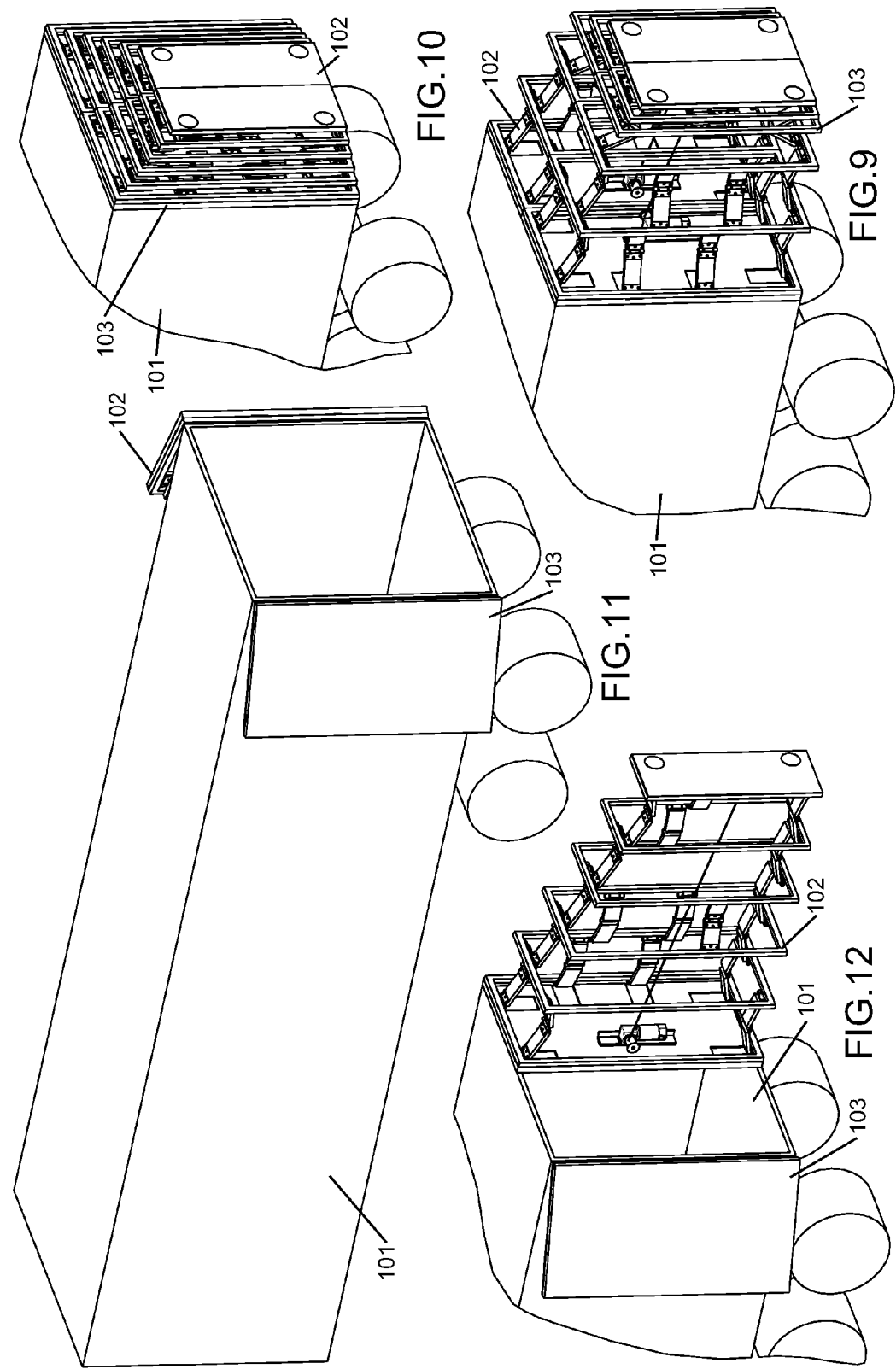

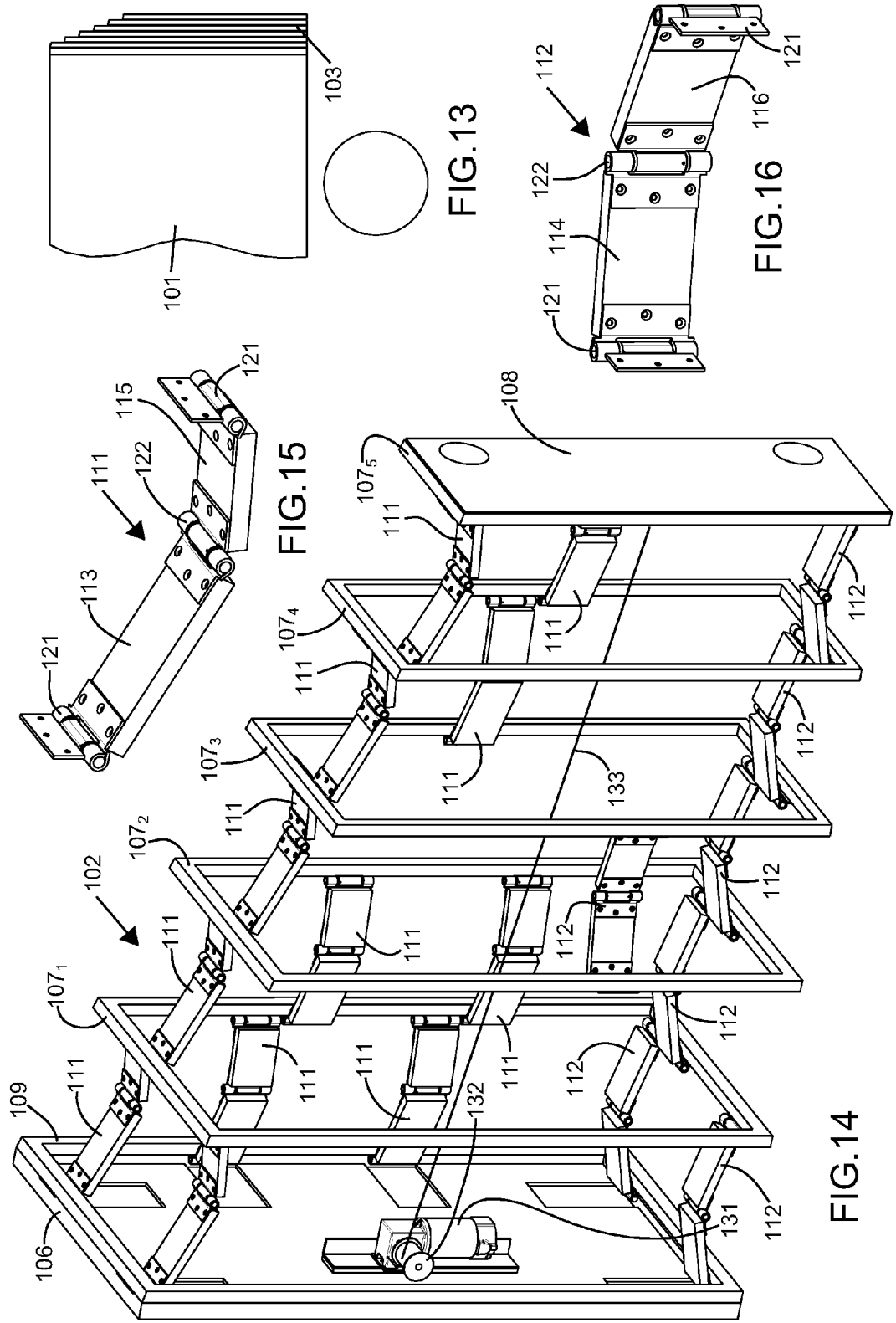

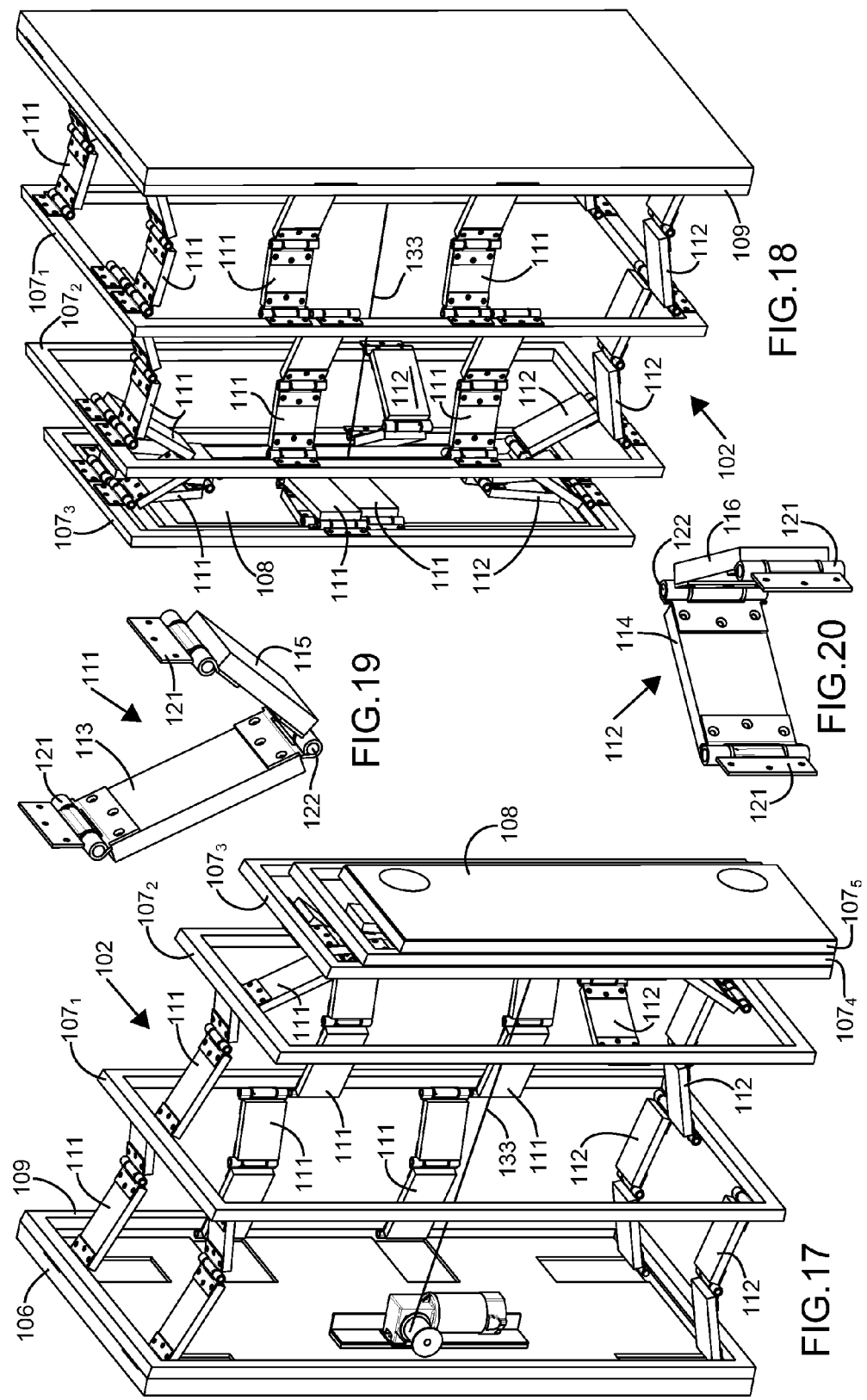

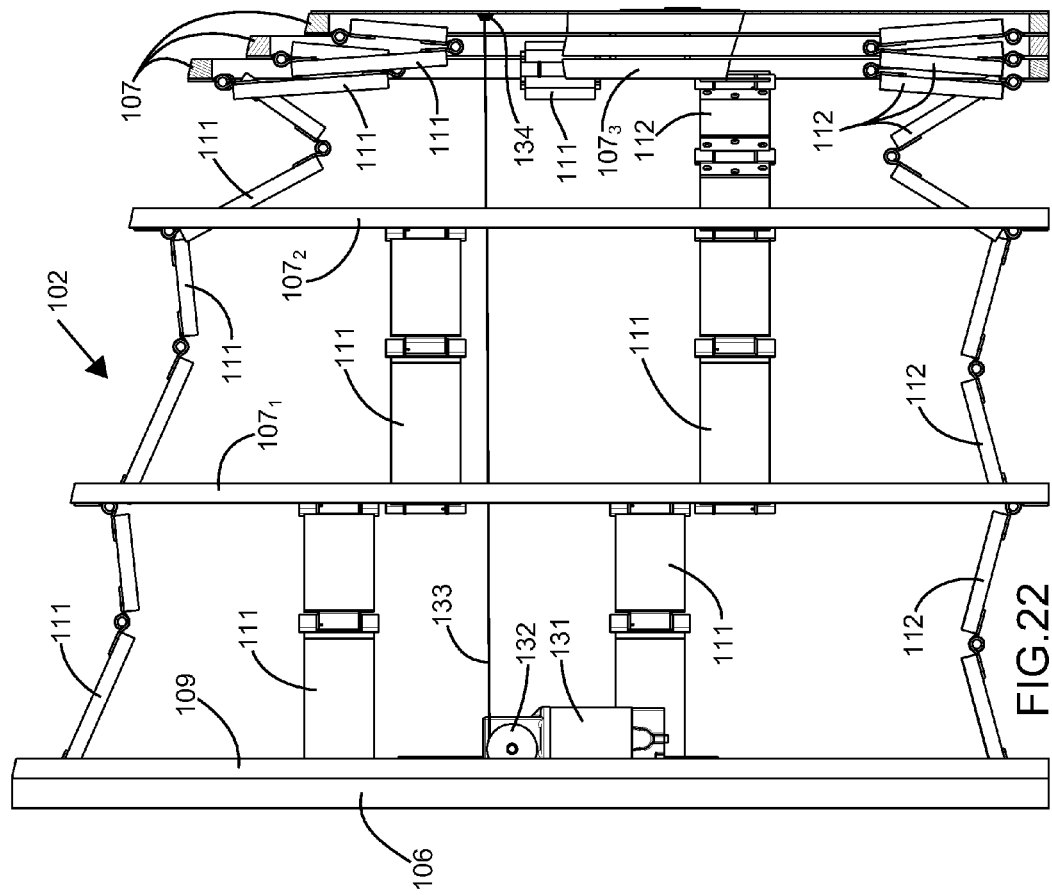
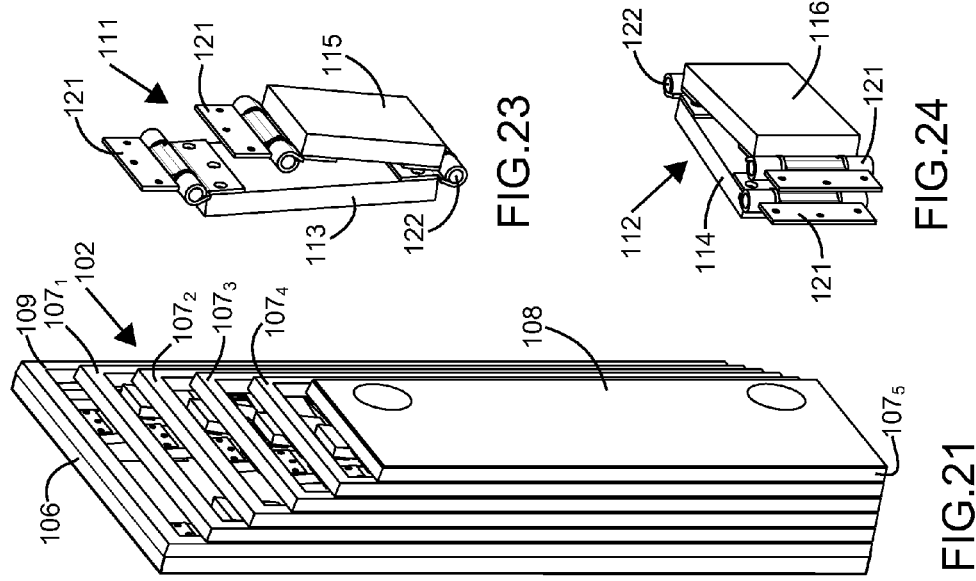
FIG.22
FIG.23
FIG.24
FIG.21

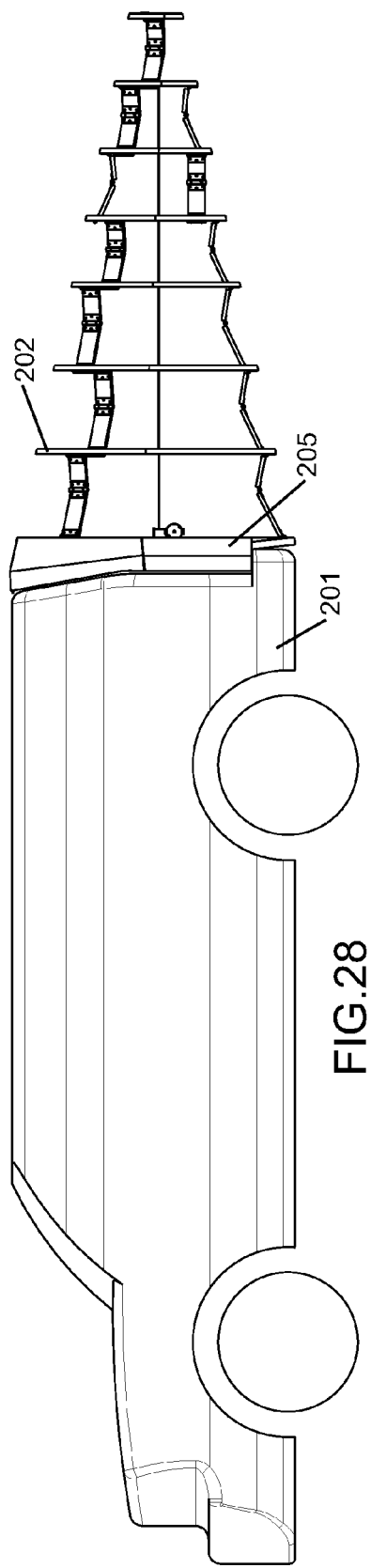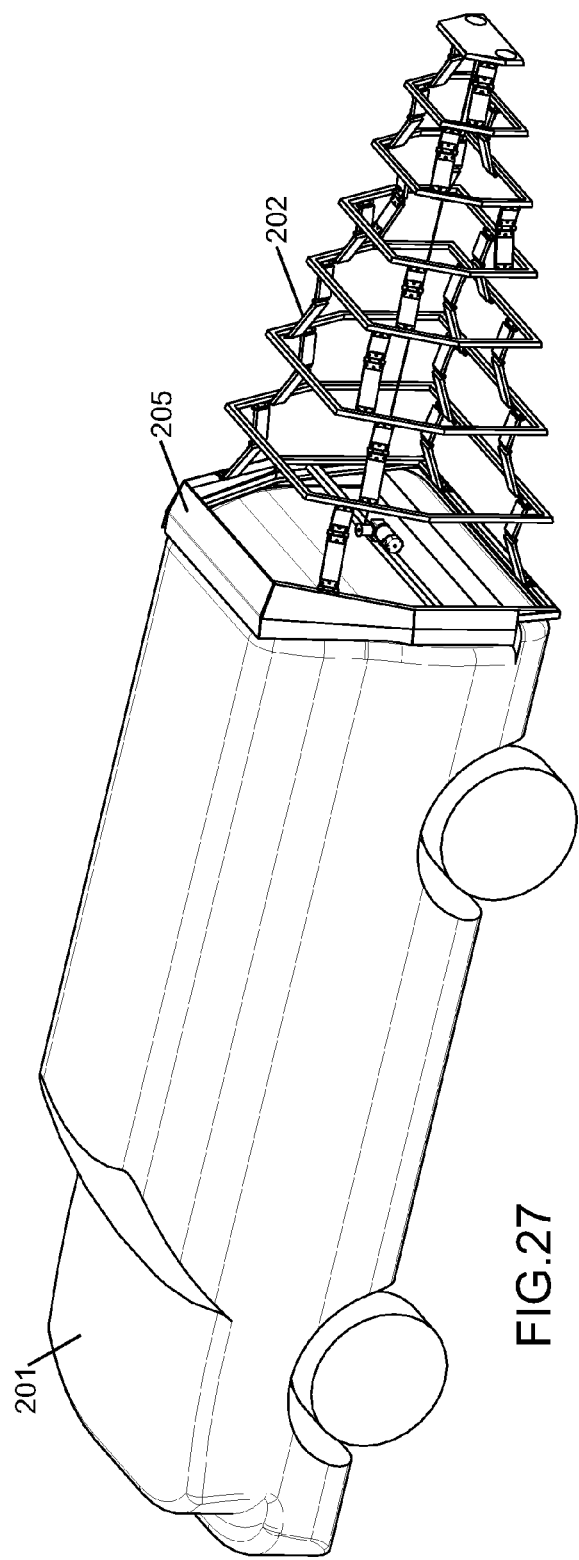

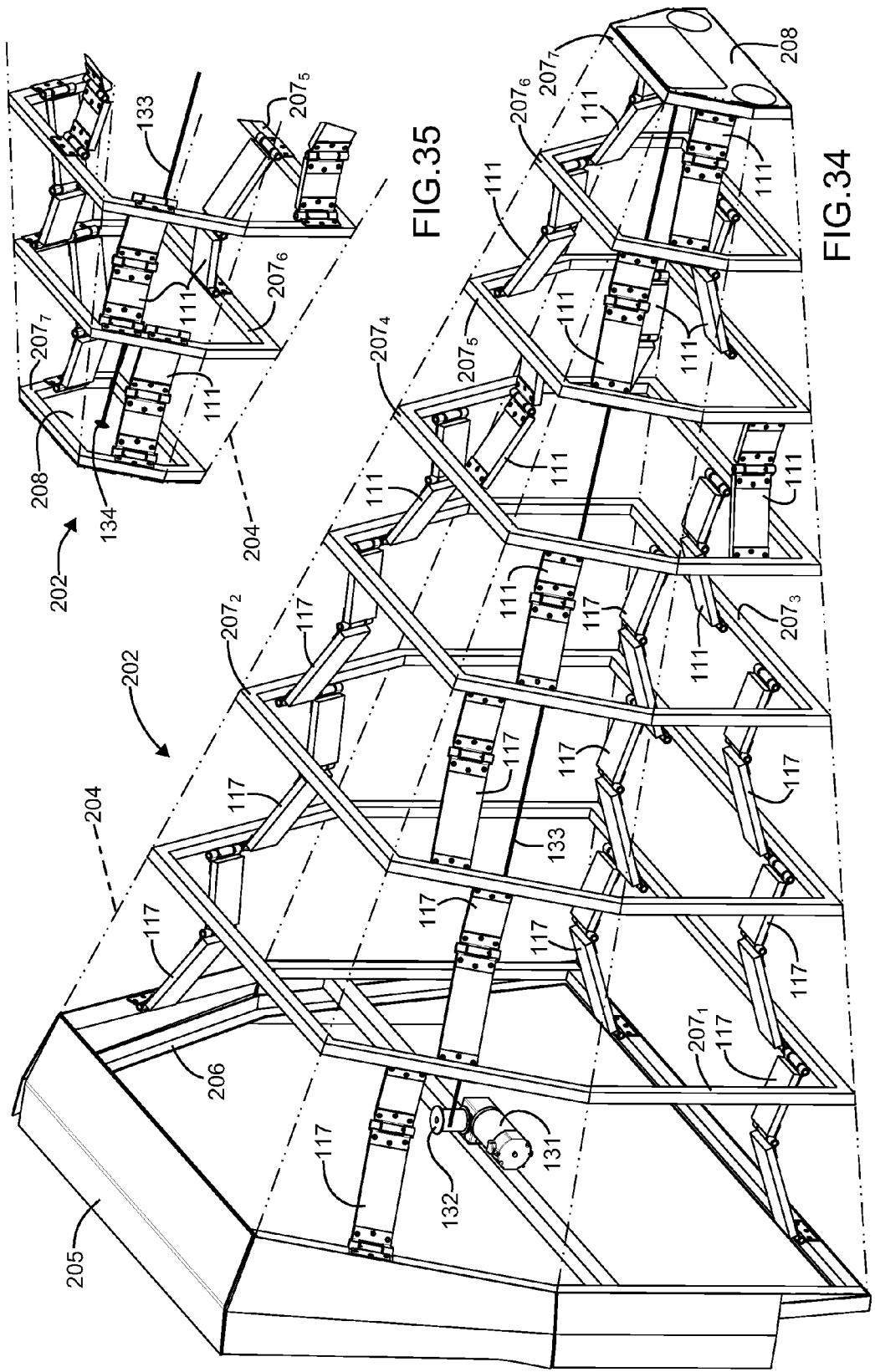

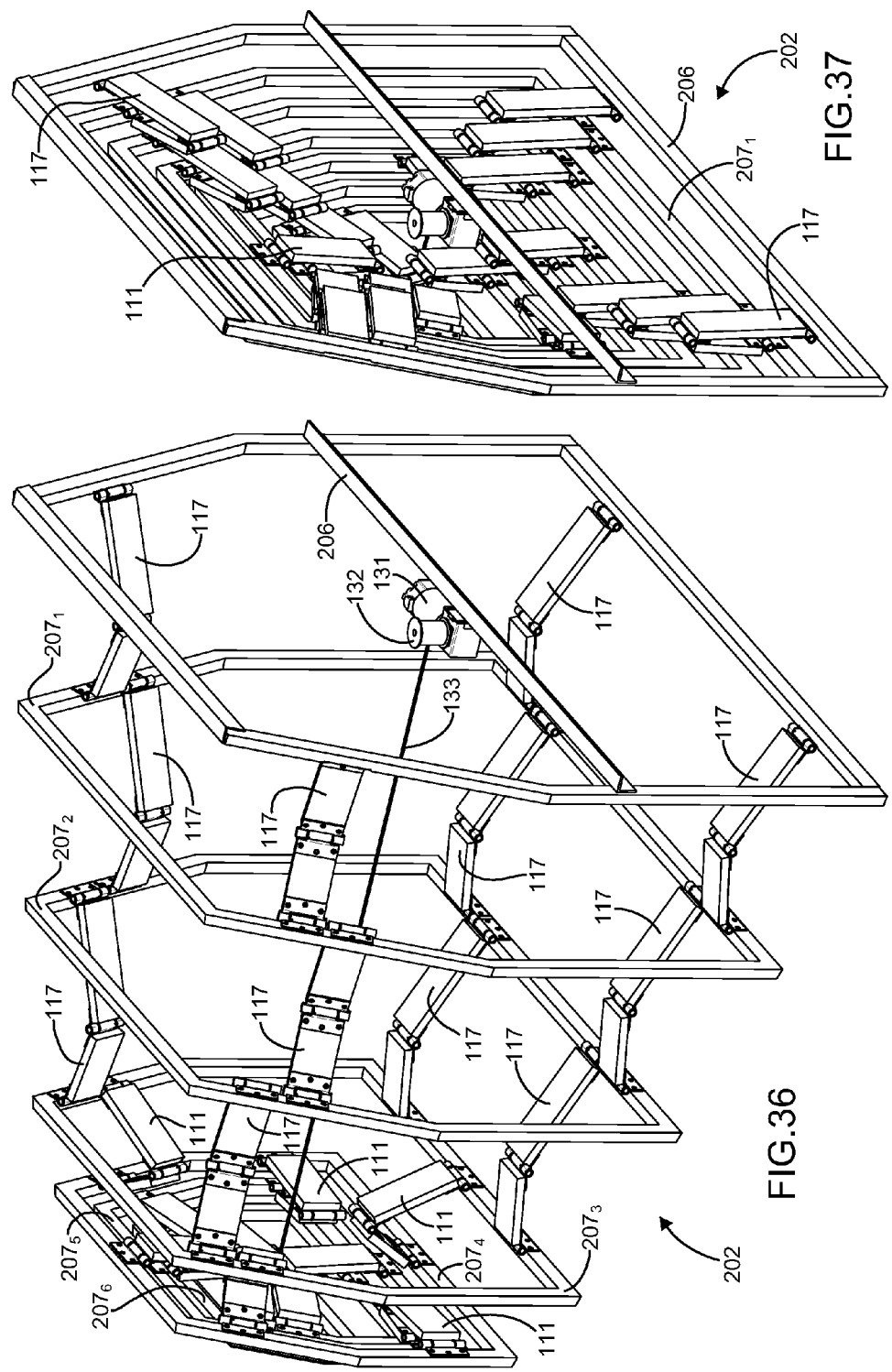

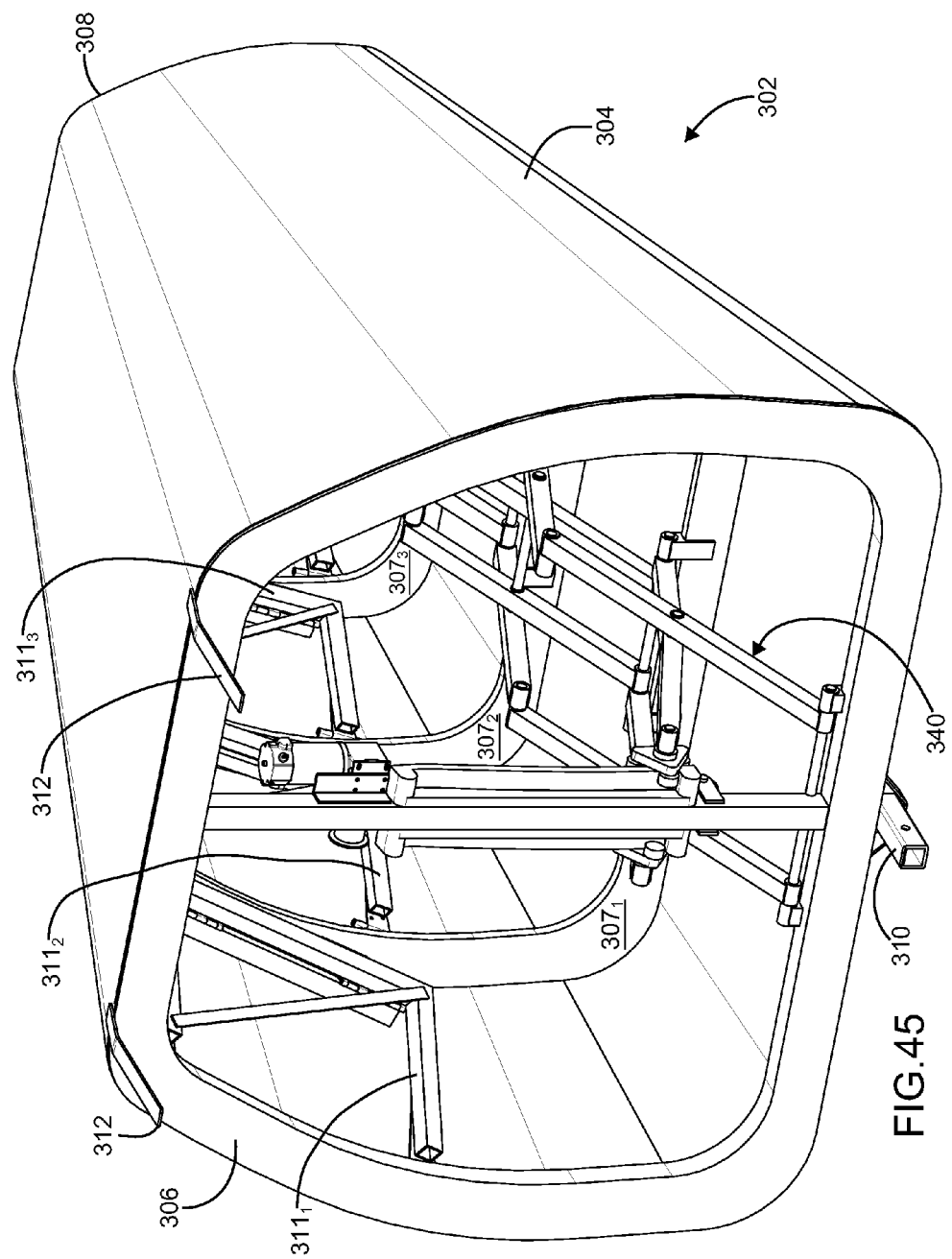

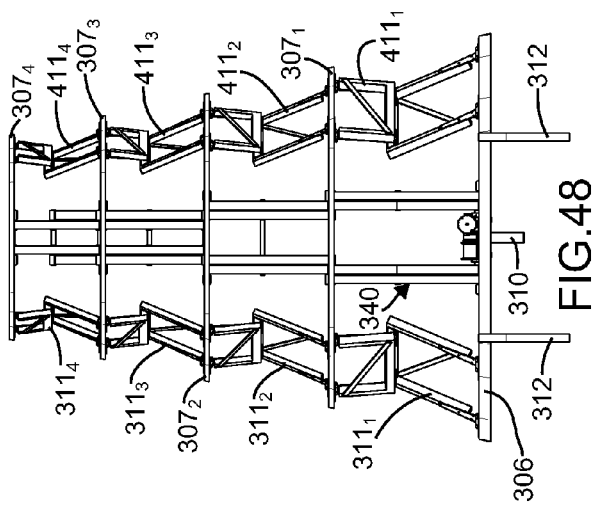
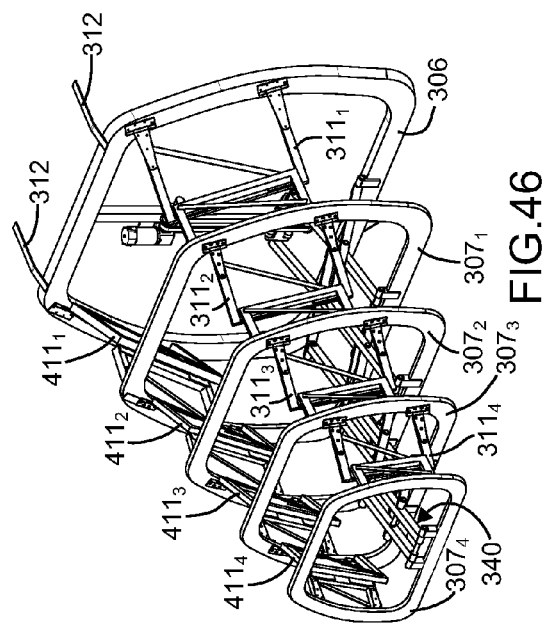
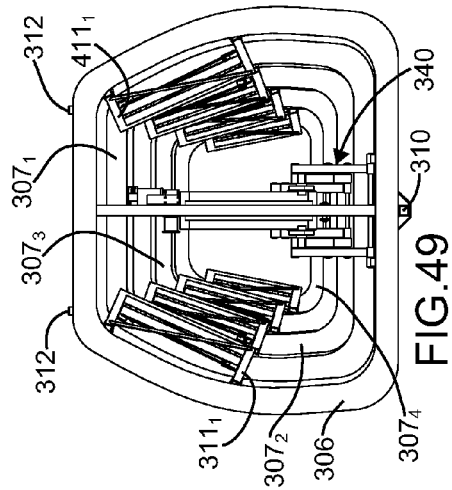
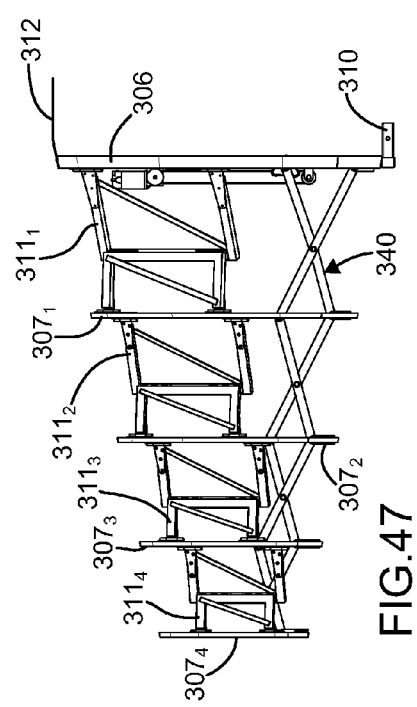

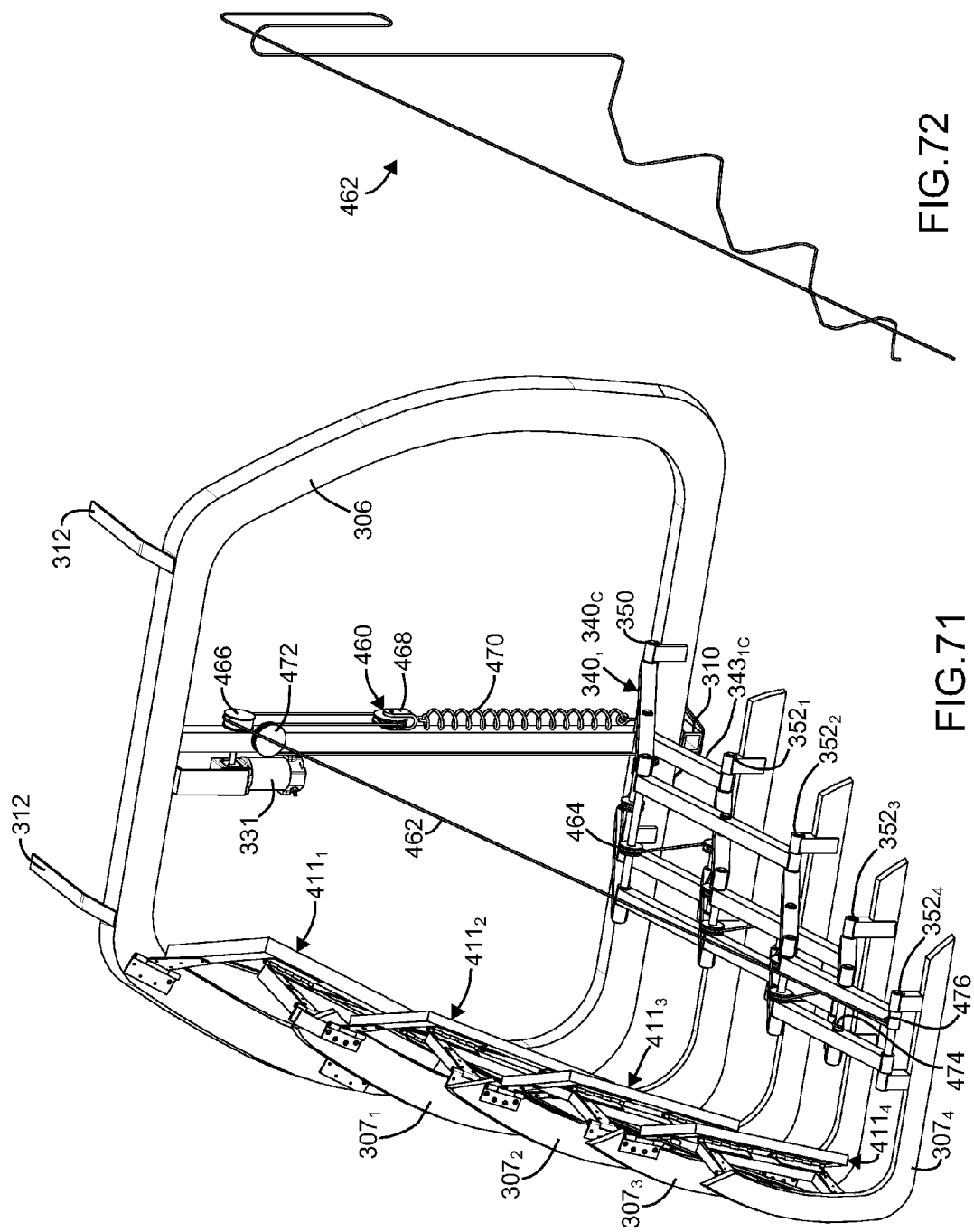

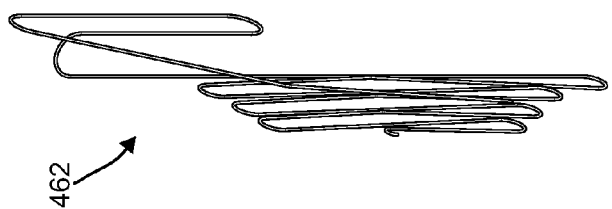
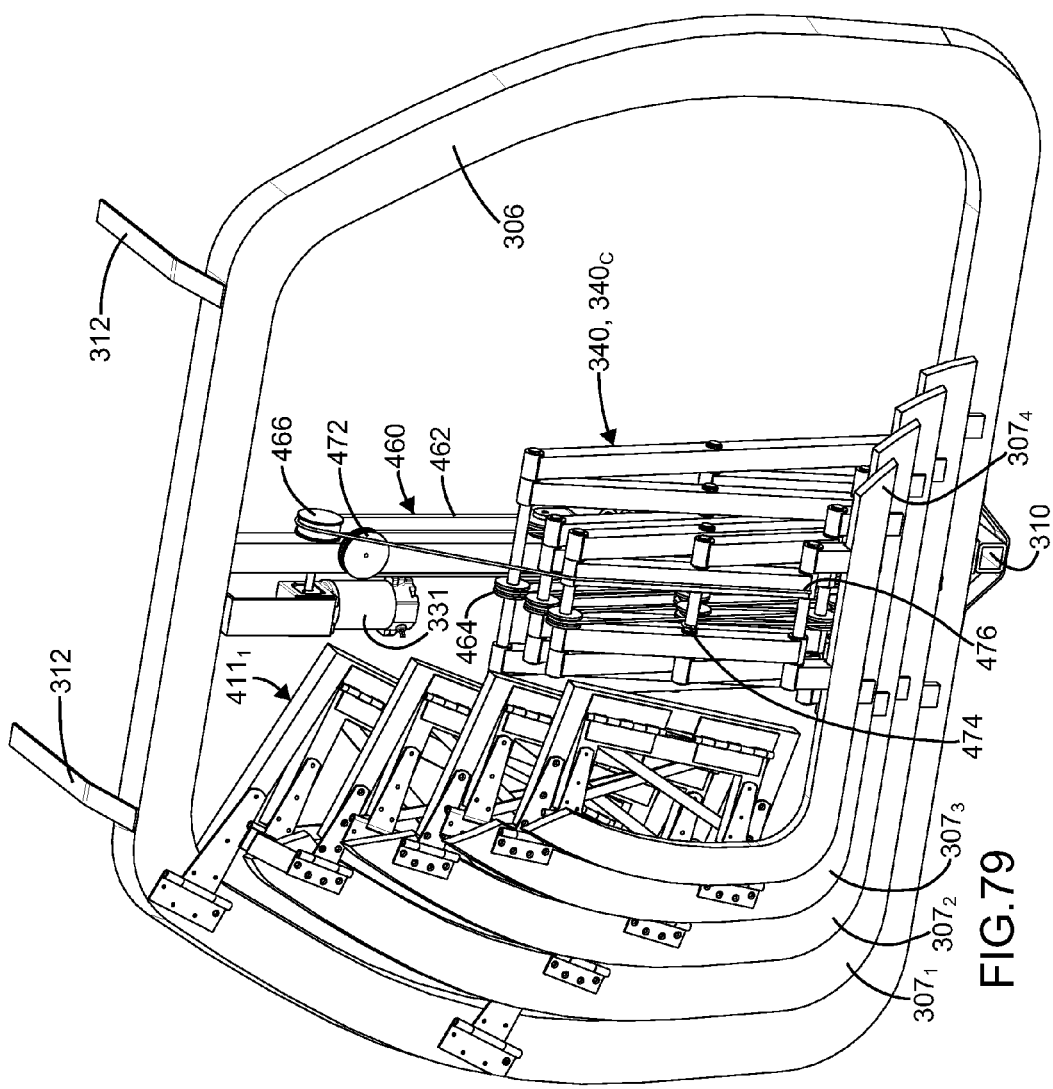

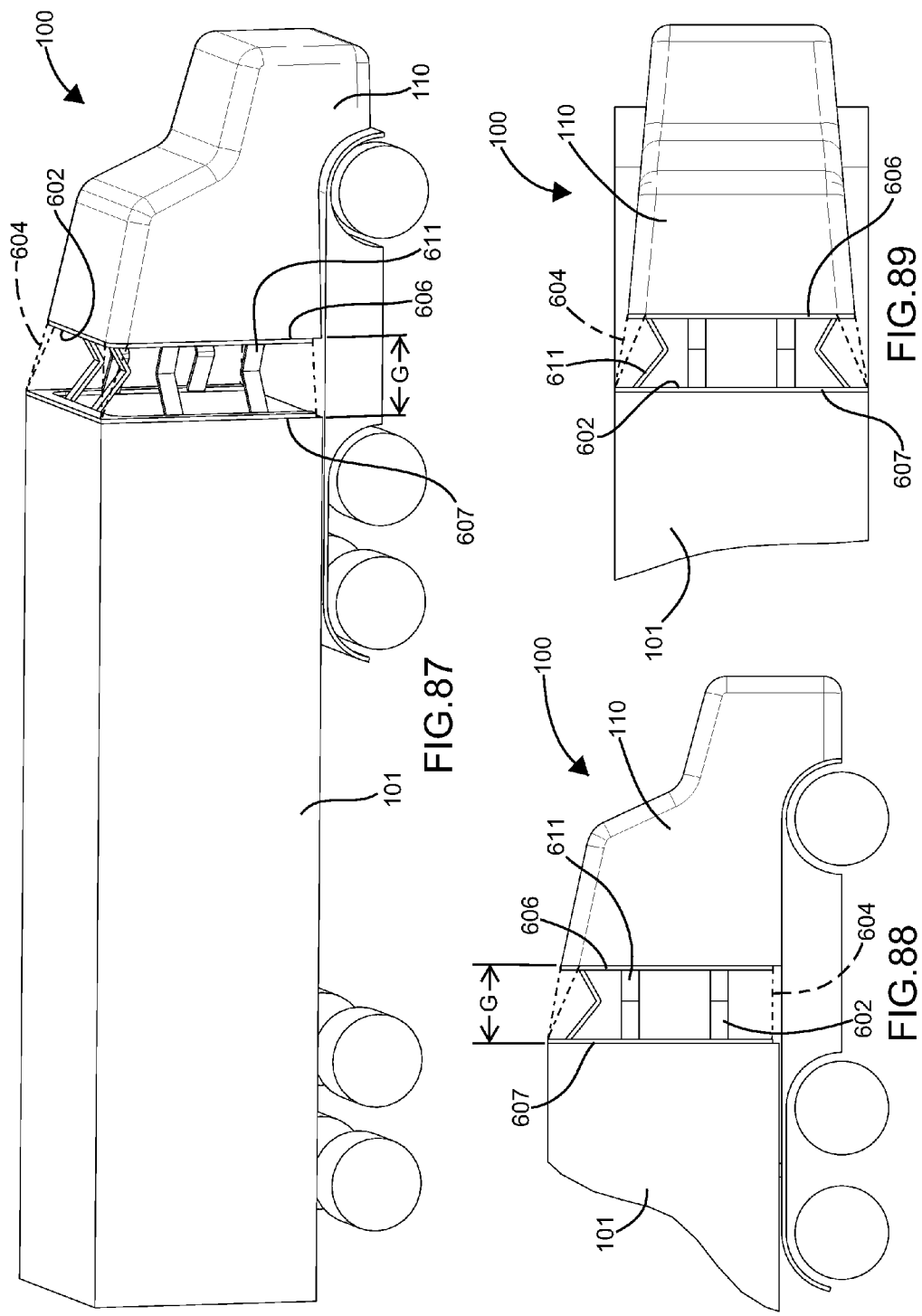

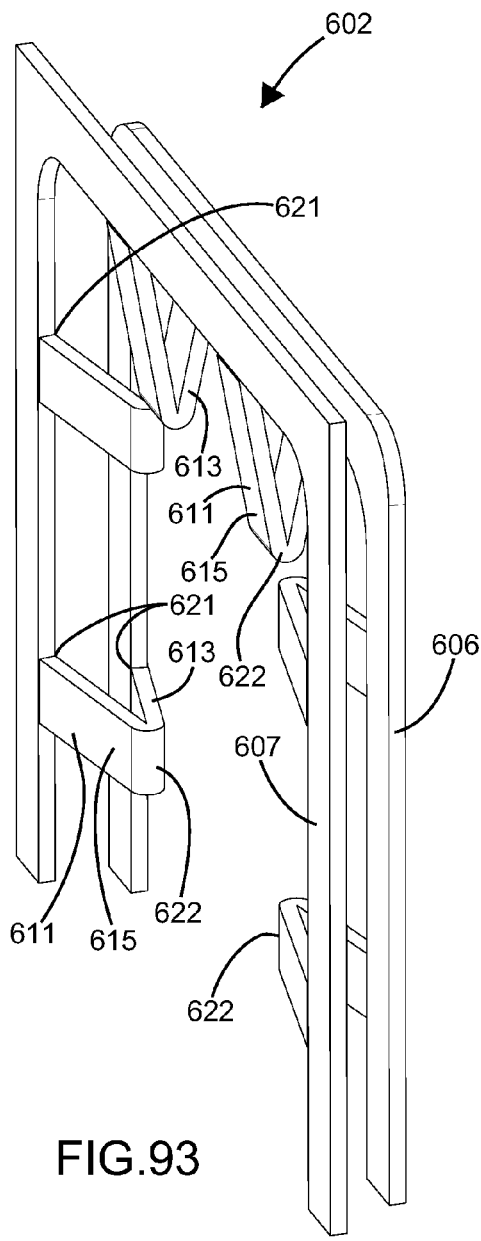
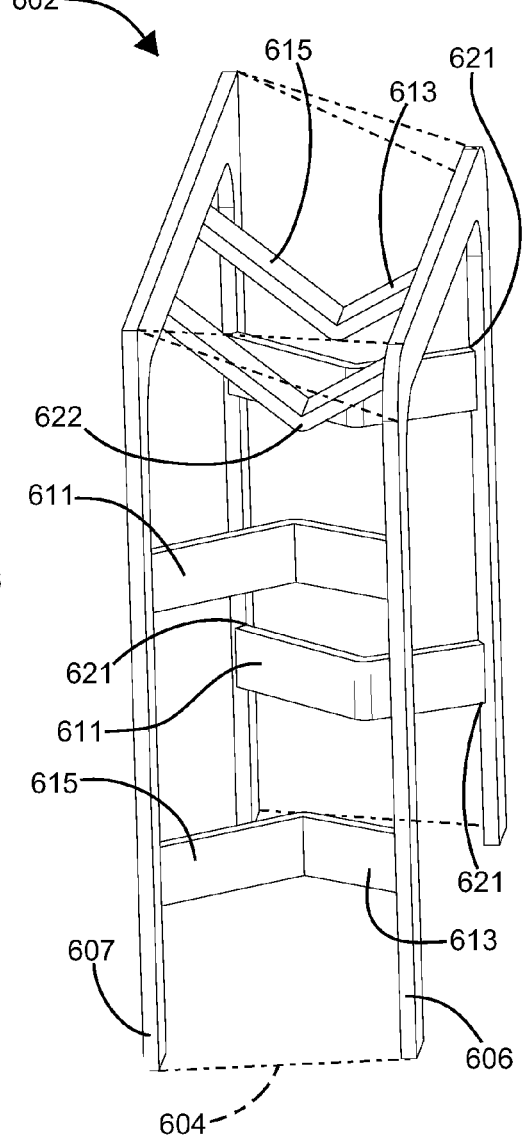
FIG.93
FIG.92

AERODYNAMIC DRAG REDUCING APPARATUS

CROSS-REFERENCE TO RELATED APPLICATIONS

This application is a continuation of U.S. patent application Ser. No. 14/262,990, filed Apr. 28, 2014, which is a continuation of U.S. patent application Ser. No. 13/367,024, filed Feb. 6, 2012, now U.S. Pat. No. 8,708,398, which is a continuation of U.S. patent application Ser. No. 12/962,040, filed Dec. 7, 2010, now abandoned, which is a continuation of U.S. patent application Ser. No. 12/134,348, filed Jun. 6, 2008, now U.S. Pat. No. 7,845,708, issued on Dec. 7, 2010, which claims the benefit of U.S. Provisional Patent Application Ser. No. 61/029,922, filed Feb. 21, 2008 and U.S. Provisional Patent Application Ser. No. 60/942,457, filed Jun. 6, 2007, which applications are hereby incorporated by reference in their entireties.

This application is related to U.S. patent application Ser. No. 11/565,254, filed Nov. 30, 2006, now U.S. Pat. No. 7,374,230, issued on May 20, 2008, which claims the benefit of U.S. Provisional Patent Application Ser. No. 60/741,155, filed Dec. 1, 2005; and, this application is related to U.S. patent application Ser. No. 11/425,854, filed Jun. 22, 2006, now U.S. Pat. No. 7,380,868, issued on Jun. 3, 2008, which claims the benefit of U.S. Provisional Patent Application Ser. Nos. 60/694,865, filed Jun. 29, 2005, 60/705,026, filed Aug. 2, 2005, and 60/705,029, filed Aug. 3, 2005; which patents and applications are hereby incorporated by reference in their entireties.

TECHNICAL FIELD

The present disclosure relates to aerodynamic drag reducing devices for use with vehicles.

BACKGROUND

Certain vehicles have downstream surfaces, at or near the vehicle's rear, that are not streamlined. Examples include: over-the-road trucks and truck trailers, vans and minivans, motor homes and travel trailers, and pickup trucks. In vehicles such as pickup trucks, one non-streamlined surface is near the vehicle's center. Certain vehicles, such as semi-trailer trucks have gaps between otherwise streamlinable exterior surfaces along the vehicle's length. In the case of the semi-trailer truck, a gap is typically present between a tractor unit and a semi-trailer. Certain of the above vehicles also include rear doors or tail gates.

It is known that a significant amount of aerodynamic drag is created when a vehicle travels at velocities typical on a modern roadway. This is due, in large part, to areas of low pressure that are induced on rearward surfaces of the vehicle. The low pressure becomes more pronounced as airflow over the vehicle separates from the rearward surfaces of the vehicle. The phenomenon of airflow separation is also known in aircraft wing design and, in this case, causes the wing to stall.

Moving vehicles having blunt rear ends and surfaces facing mainly rearward are especially affected by airflow separation starting at an abrupt transition between side, top, and bottom surfaces and the near vertical rearward facing surfaces. The low pressure that the airflow separation induces is compounded by a relatively large area on which the low air pressure acts in comparison with more streamlined vehicles.

Moving vehicles having an interruption in otherwise streamlined, near streamlined, or streamlinable exterior surfaces along the length of the vehicle are subjected to increased aerodynamic drag created by turbulence as airflow over the vehicle crosses the interruption.

The low air pressure (partial vacuum) acting on the rear surfaces of a moving vehicle produces a drag force that resists forward motion of the vehicle. Increased turbulence caused by gaps and interruptions in otherwise streamlined or streamlinable exterior surfaces also produces a drag force that resists the forward motion of the vehicle. These drag forces are opposed by the vehicle's engine and require power that is typically produced by burning fuel. Any reduction in aerodynamic drag results in a reduction in fuel consumption.

In an era of high fuel prices and increasing environmental consciousness, fuel efficiency improvements are a growing concern. Aerodynamic improvements are especially valuable since they can be combined with other improvements such as engine efficiency and reduced chassis weight. Increased fuel efficiency also provides a valuable benefit of increasing a range a given vehicle can travel between refuelings.

At a given speed, streamline vehicles, such as certain high-speed cars and airplanes, have markedly lower airflow separation and therefore markedly lower aerodynamic drag in comparison with vehicles having blunt rear ends. Such streamline vehicles generally have gently tapering reward surfaces designed to keep airflow attached. A similar streamlining technique has also been applied to over-the-road trucks where it is known as a "boat-tail". Boat-tails significantly increase the length of a vehicle. In addition, they may interfere with convenient access to the rear doors of the vehicle. There is a need for a device that provides streamlined rear surfaces to the rear of vehicles having blunt rear ends without introducing unacceptable limitations to the vehicle length or the rear door function. There is also a need to bridge gaps across discontinuities along the length of vehicles, such as the gap between the tractor unit and the semi-trailer of the semi-trailer truck. The present disclosure satisfies these and other needs.

SUMMARY

The present disclosure is concerned with providing an aerodynamic drag reducing apparatus for vehicles for the purpose of reducing energy consumption. More specifically, in certain embodiments, this is achieved by adding gently sloping surfaces downstream of rearward facing surfaces of the vehicle with a goal of reducing airflow separation and aerodynamic drag. More specifically, in other embodiments, this is achieved by flexibly filling gaps and/or discontinuities along a length of the vehicle. Both of these techniques, used separately or together, reduce fuel consumption of the vehicle.

When the concepts of the present disclosure are employed to add a tapering rear surface(s) to a vehicle, means are included to retract and extend the tapering rear surface(s) when needed for various purposes. In addition, certain embodiments of the present disclosure may be mounted on or integrated with one or more rear doors of a vehicle thereby allowing access to the rear of the vehicle. Alternatively, other embodiments of the present disclosure may include means for moving the aerodynamic apparatus to allow access to the rear of the vehicle.

When the concepts of the present disclosure are employed to add fill surfaces that flexibly fill gaps and/or discontinuities along the length of the vehicle, means are included to lengthen and shorten the fill surfaces when needed. For example, a gap typically exists between a tractor unit and a semi-trailer of a semi-trailer truck while heading straight down a level road. Portions of the gap expand and contract as the semi-trailer truck encounters bumps and other slope changes on the road. In addition, when the semi-trailer truck executes a turn and certain parking maneuvers, a portion of the gap on one side of the semi-trailer truck can greatly expand while a portion of the gap on the opposite side greatly contracts. In certain embodiments, a main purpose of the fill surfaces are to fill the gap between the tractor unit and the semi-trailer of the semi-trailer truck while heading approximately straight down a road with an approximately uniform slope. This condition exists for a large share of driving time under many normal driving routines, especially at high speeds, and is where aerodynamic benefits are most valuable. Under other driving conditions, especially at low speeds while executing sharp turns, portions of the gap may expand beyond the reach of the fill surfaces creating a gap between the fill surfaces and the semi-trailer or the tractor unit.

On certain vehicles, simply adding the required gently sloping surfaces to the rear of the vehicle would result in a substantial increase in vehicle length. This length increase would be acceptable, in many cases, on the open road in uncongested traffic, but would be impractical on crowded urban roadways, in parking lots, in campgrounds, and by loading docks. To address this, certain embodiments of the present disclosure have two primary configurations. The first is an extended configuration that reduces drag and fuel consumption, especially at highway speeds. The second is a retracted configuration that provides much less, if any, drag reduction, but results in a more compact vehicle that is practical in crowded areas. This combination of configurations in the same apparatus is especially useful since zones of higher speed traffic are often not congested. These high-speed zones are also where the drag reducing potential is the highest. Likewise, congested areas often have reduced traffic speed with less drag reducing potential, but in these cases, the retracted configuration may be required for maneuvering.

In order to easily and conveniently transform the aerodynamic drag reducing apparatus between the retracted configuration and the extended configuration, one or more exterior covers are held by one or more moveable frames. A first moveable frame (or first set of moveable frames) is held to the vehicle by a first set of support linkages providing support and position control for the first moveable frame. Optionally, additional moveable frames are also held by additional sets of support linkages. Each additional set of support linkages connects its corresponding moveable frame to the moveable frame preceding it.

Means for limiting the motion of each moveable frame is provided. The motion of each moveable frame is preferably limited to positions between its extended configuration position and its retracted configuration position. In certain embodiments, the support linkages have joint stops for this purpose. In other embodiments, one or more tensile load carrying members, such as a cord or a chain, are attached to the moveable frame and become taut when the moveable frame has reached its extended configuration position. In still other embodiments, the exterior cover(s) serves as the tensile load carrying member for this purpose. In yet other embodiments, a driving linkage limits the motion of each moveable frame or some of the moveable frames.

Means for biasing the aerodynamic drag reducing apparatus to move toward either the extended configuration and/or the retracted configuration may optionally be provided. In certain embodiments, the support linkages and/or the optional driving linkage may have one or more joints that are spring loaded for this purpose. This can include bi-stable joints (e.g., a joint with two detents) to move away from a central position and toward the extended configuration when near the extended configuration and toward the retracted configuration when near the retracted configuration. In other embodiments, the support linkages and/or the optional driving linkage may have flexible, spring elements that replace one or more joints. The spring elements can also bias the support linkage and/or the optional driving linkage in one or both directions.

Means for automatically extending and retracting the aerodynamic drag reducing apparatus is optionally provided. In certain embodiments, a retraction tension-cable, attached to an end moveable frame, is reeled in by a pulley powered by a motor. In addition, the support linkages and/or the optional driving linkage are biased to extend the apparatus as mentioned in the preceding paragraph. Thus, operating the motor in a first direction overpowers the support linkage and/or driving linkage bias and retracts the apparatus while operating the motor in a second, opposite direction feeds the retraction tension-cable outward and allows the biased (e.g., spring-loaded) support linkages and/or driving linkage to extend the apparatus. In embodiments filling a gap, bearing loads from across the gap can retract the extension biased apparatus. In this case, movement of the vehicle causing at least a portion of the gap to become smaller can cause portions of the vehicle to bear against the apparatus and overpower the extension bias thus causing the apparatus to retract (e.g., a corner of the semi-trailer can reduce the gap and bear against the apparatus during a sharp turn causing it to retract). The extension bias returns the apparatus to the extended configuration as the gap expands (e.g., upon returning to a straight course, the corner of the semi-trailer restores the gap and the extension bias extends the apparatus). Outwardly biasing the support linkage and/or driving linkage is one method of outwardly biasing the apparatus. Other methods include pressurized air within the apparatus, an extension spring between the apparatus' ends, and combinations of these and other methods.

In an alternative embodiment, the support linkages and/or the optional driving linkage are biased to retract the apparatus which can be extended by partial vacuum created by vehicle movement operating on the exterior covers. In addition to or separately from the partial vacuum, a positive pressure can be created within the apparatus by a forward opening into oncoming airflow. The forward opening converts dynamic pressure of the oncoming airflow into static pressure within the apparatus, thus extending the apparatus. In another alternative embodiment, the retraction biased apparatus is extended by compressed air fed within the apparatus. In embodiments filling a gap, tension cables and/or stretchable cords can extend the retraction biased apparatus. In this case, the tension cables pull to extend the apparatus from across the gap and may be tensioned by a motor, cable tensioning springs, the stretchable cord itself, or other means.

In certain embodiments, the driving linkage (e.g., a scissor linkage) is provided to extend and/or retract the apparatus. The example scissor linkage may be actuated by an actuator that causes the scissor linkage to extend and retract, thus extending and retracting the apparatus. The actuator may include a drive that directly moves certain points of the scissor linkage. Such a drive may include a screw and nut assembly. Other such drives may include a belt and pulley arrangement. The scissor linkage may be extended by routing a tension-cable between various joints and/or points of the scissor linkage. A motor may retract the tension-cable drawing certain of the joints and/or points together thus extending the scissor linkage. In embodiments where a tension-cable extends the scissor linkage, the same tension-cable or another tension-cable may retract the apparatus by pulling part of the apparatus toward the retracted configuration.

To accommodate vehicles where access to the rear end is required, certain embodiments of the present disclosure allow the apparatus to be temporarily moved without removal from the vehicle. In certain embodiments, a single whole apparatus is mounted on a support panel, door, framework, etc. that in turn is mounted on a hinge, linkage, linear slide, etc. Other embodiments have the overall aerodynamic shape split into two halves. These halves can be mounted on hinges and opened, providing access to the rear of the vehicle. Optionally, the halves can be integrated with the rear doors of the vehicle.

BRIEF DESCRIPTION OF THE DRAWINGS

The benefits and advantages of the present disclosure will become more readily apparent to those of ordinary skill in the relevant art after reviewing the following detailed description and accompanying drawings, wherein:

FIGS. 1 through 13 illustrate an embodiment of right and left aerodynamic drag reducing apparatuses adapted for use behind an over-the-road trailer having right and left rear trailer doors. The right apparatus is mounted on the right door and the left apparatus is mounted on the left door. In particular:

FIGS. 1 through 8 illustrate the apparatuses of FIG. 2 in a fully extended configuration. In particular:

FIGS. 1 through 4 illustrate the apparatuses with a flexible covering defining an exterior shape. In particular:

FIG. 1 is a left elevation view.
FIG. 2 is a partial rear left perspective view.
FIG. 3 is a partial top plan view.
FIG. 4 is a rear elevation view.

FIGS. 5 through 8 illustrate the apparatuses with the flexible covering removed revealing a plurality of support linkages within. In particular:

FIG. 5 is a left elevation view.
FIG. 6 is a partial rear left perspective view.
FIG. 7 is a partial top plan view.
FIG. 8 is a rear elevation view.

FIGS. 9 through 12 are rear left perspective views illustrating the apparatuses of FIG. 2 with the flexible covering removed revealing the support linkages within. In particular:

FIG. 9 is a partial view showing both apparatuses in a partially extended configuration.

FIG. 10 is a partial view showing both apparatuses in a fully retracted configuration with the trailer doors both closed.

FIG. 11 shows both apparatuses in the fully retracted configuration with the trailer doors both open.

FIG. 12 is a partial view showing the right apparatus fully extended with the right trailer door closed and the left apparatus fully retracted and hidden behind the left trailer door which is open.

FIG. 13 is a partial left elevation view illustrating the apparatuses of FIG. 2 in the fully retracted configuration with the flexible covering removed.

FIG. 14 is a rear left perspective view of the right apparatus of FIG. 2 in the fully extended configuration with the flexible covering removed revealing the support linkages within.

FIG. 15 is a perspective view of a support linkage assembly used between sloping attachment points of the apparatuses of FIGS. 2, 25, and 40 in the fully extended configuration of FIGS. 14 and 34.

FIG. 16 is a perspective view of a support linkage assembly used between non-sloping attachment points of the apparatuses of FIG. 2 in the fully extended configuration of FIG. 14.

FIGS. 17 and 18 illustrate the right apparatus of FIG. 2 in a partially extended configuration with the flexible covering removed revealing the support linkages within. In particular:

FIG. 17 is a rear left perspective view.
FIG. 18 is a front right perspective view.

FIG. 19 is a perspective view of the support linkage assembly of FIG. 15 in the partially extended configuration of the third set of support linkages of FIGS. 17 and 18 and the fourth set of support linkages of FIG. 36.

FIG. 20 is a perspective view of the support linkage assembly of FIG. 16 in the partially extended configuration of the third set of support linkages of FIGS. 17 and 18.

FIG. 21 is a rear left perspective view of the right apparatus of FIG. 2 in the fully retracted configuration with the flexible covering removed partially revealing the support linkages within.

FIG. 22 is a partial cross-sectional left elevation view of the right apparatus of FIG. 2 in the partially extended configuration of FIGS. 17 and 18 with the flexible covering removed.

FIG. 23 is a perspective view of the support linkage assembly of FIG. 15 in the fully retracted configuration of FIGS. 21 and 37.

FIG. 24 is a perspective view of the support linkage assembly of FIG. 16 in the fully retracted configuration of FIG. 21.

FIGS. 25 through 39 illustrate another embodiment of an aerodynamic drag reducing apparatus adapted for use behind a sports-utility vehicle. In particular:

FIGS. 25 through 33 illustrate the apparatus of FIG. 25 and an adapter fairing mounted behind the sports-utility vehicle. In particular:

FIGS. 25 through 30 illustrate the apparatus in a fully extended configuration. In particular:

FIGS. 25 and 26 illustrate the apparatus with a flexible covering defining an exterior shape. In particular:

FIG. 25 is a rear left perspective view.
FIG. 26 is a left side elevation view.

FIGS. 27 through 30 illustrate the apparatus with the flexible covering removed revealing the support linkages within. In particular:

FIG. 27 is a rear left perspective view.
FIG. 28 is a left side elevation view.
FIG. 29 is a partial top plan view.
FIG. 30 is a rear elevation view.

FIGS. 31 through 33 illustrate the apparatus with the flexible covering removed revealing the support linkages within. In particular:

FIGS. 31 and 32 are partial rear left perspective views. In particular:

FIG. 31 illustrates the apparatus in a partially extended configuration.

FIG. 32 illustrates the apparatus in a fully retracted configuration.

FIG. 33 is a partial left side elevation view illustrating the apparatus in the fully retracted configuration.

FIGS. 34 through 39 illustrate the unmounted apparatus of FIG. 25. In particular:

FIGS. 34 and 35 illustrate the apparatus in the fully extended configuration with the flexible covering shown in phantom revealing the support linkages within. In particular:

FIG. 34 is a rear left perspective view also showing the adapter fairing.

FIG. 35 is a partial front right perspective view.

FIGS. 36 and 37 are front right perspective views with the flexible covering removed revealing the support linkages within. In particular:

FIG. 36 illustrates the apparatus in the partially extended configuration of FIG. 31.

FIG. 37 illustrates the apparatus in the fully retracted configuration.

FIGS. 38 and 39 are cross-sectional left elevation views cut lengthwise through the partially extended apparatus showing the right half of the apparatus. In particular:

FIG. 38 illustrates the apparatus with the flexible covering removed.

FIG. 39 illustrates the apparatus with the flexible covering represented as a two-dimensional cross section.

FIGS. 41 through 86 illustrate yet another embodiment of an aerodynamic drag reducing apparatus adapted for use behind the sports-utility vehicle of FIG. 25. In particular:

FIGS. 41 through 44 illustrate the apparatus of FIG. 41 in a fully extended configuration mounted behind the sports-utility vehicle together with another adapter fairing. In particular:

FIG. 41 is a rear right perspective view.

FIG. 42 is a right side elevation view.

FIG. 43 is a partial top plan view.

FIG. 44 is a rear elevation view.

FIG. 45 is a front left perspective view illustrating the apparatus of FIG. 41 removed from the sports-utility vehicle in a fully extended configuration.

FIGS. 46 through 71, 73, 75, 77, 79, and 81 illustrate the apparatus of FIG. 41 with an exterior cover removed. In particular:

FIGS. 46 through 49, 58, 65, 66, 71, and 73 illustrate the apparatus of FIG. 41 in a fully extended configuration. In particular:

FIGS. 46, 58, 65, 71, and 73 are perspective views.

FIGS. 47 and 66 are right side elevation views.

FIG. 48 is a top plan view.

FIG. 49 is a front plan view.

FIGS. 50 through 53, 59 through 61, 67, 68, 75, and 77 illustrate the apparatus of FIG. 41 in a partially extended configuration. In particular:

FIGS. 50, 59, 67, 75, and 77 are perspective views.

FIGS. 51, 60, 68 are right side elevation views.

FIG. 52 is a top plan view.

FIG. 61 is a partial top plan view.

FIG. 53 is a front plan view.

FIGS. 54 through 57, 62 through 64, 69, 70, 79, and 81 illustrate the apparatus of FIG. 41 in a fully retracted configuration. In particular:

FIGS. 54, 62, 69, 79, and 81 are perspective views.

FIGS. 55, 63, and 70 are right side elevation views.

FIGS. 56 and 64 are top plan views.

FIG. 57 is a front plan view.

FIGS. 72, 74, 76, 78, 80, and 82 show a tension-cable routing of the preceding view.

FIGS. 83 and 84 show the hoop frames of FIG. 58 nested within each other.

FIGS. 85 and 86 illustrate a partial cross-section of one of the hoop frames of FIG. 58. In particular:

FIG. 85 is a non-exploded view.

FIG. 86 is an exploded view.

Figure 41:
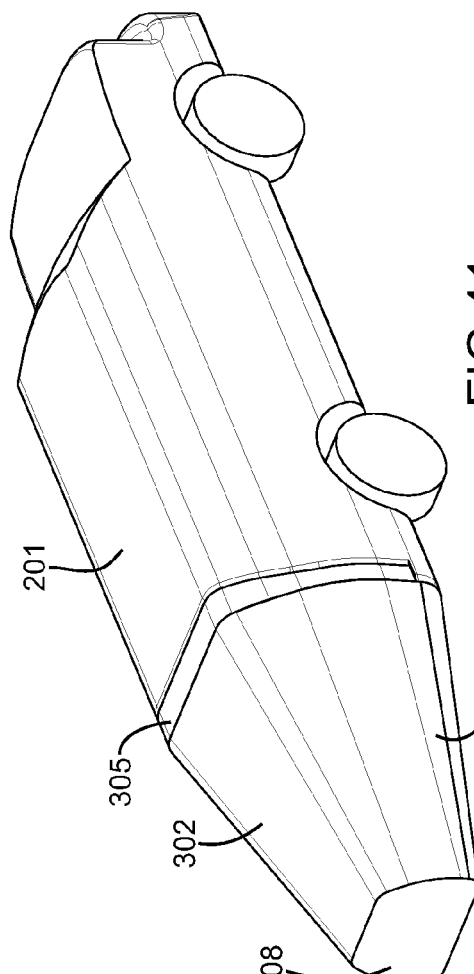

In addition:

FIGS. 45 through 64 illustrate the apparatus of FIG. 41 including a scissors linkage actuated by a belt driven rail-cam follower mechanism.

FIGS. 65 through 70 illustrate the apparatus of FIG. 41 including a scissors linkage actuated by a screw drive mechanism.

FIGS. 71, 73, 75, 77, 79, and 81 illustrate the apparatus of FIG. 41 including a scissors linkage actuated by a tension-cable drive mechanism.

FIGS. 58 through 71, 73, 75, 77, 79, and 81 are cut-away views that have removed a right-hand set of linkages and a portion of all but a first hoop frame.

FIGS. 87 through 93 illustrate yet another embodiment of an aerodynamic drag reducing apparatus adapted for use within a gap between a tractor unit and a semi-trailer of a semi-trailer truck. In particular:

FIGS. 87 through 89 illustrate the apparatus of FIG. 87 in a fully extended configuration with the semi-trailer truck in a non-turning configuration. In particular:

FIG. 87 is a right front perspective view.

FIG. 88 is a partial right elevation view.

FIG. 89 is a partial top plan view.

Figure 90:
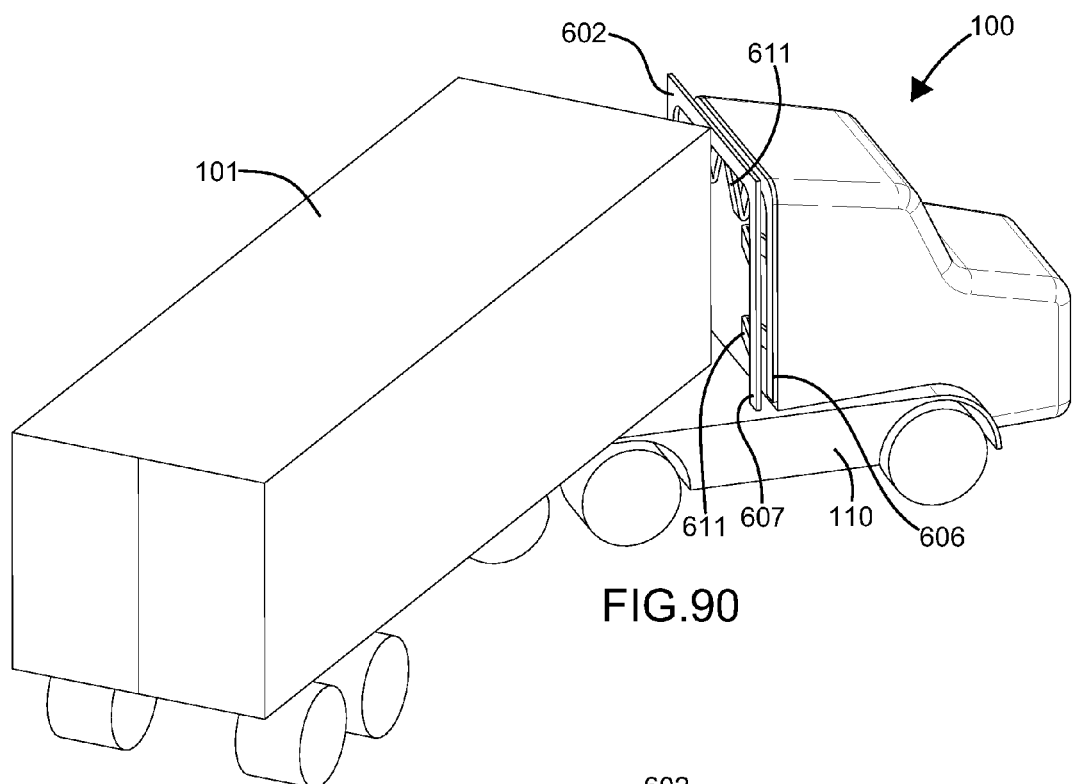
Figure 91:
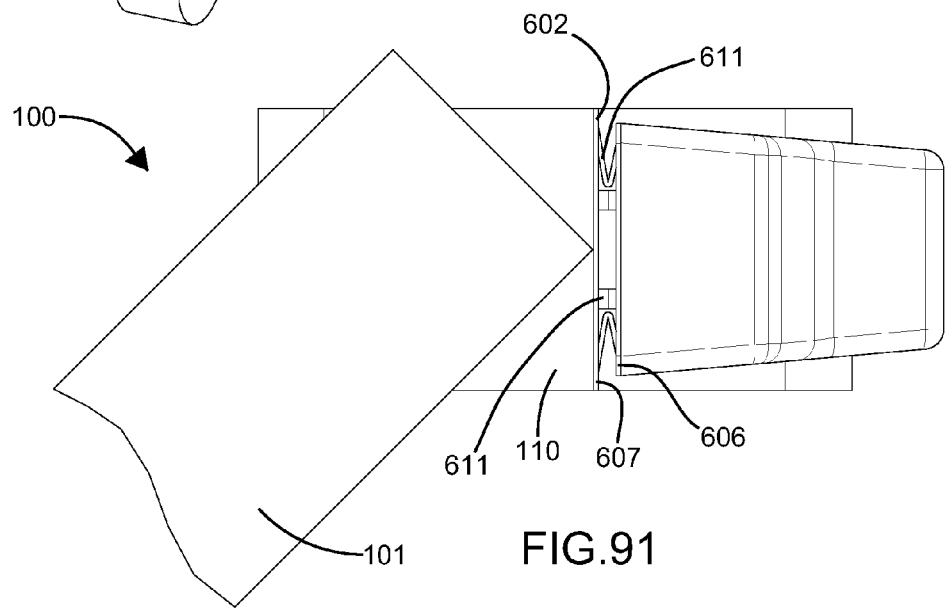

FIGS. 90 and 91 illustrate the apparatus of FIG. 87 in a retracted configuration with the semi-trailer truck in a turning configuration. In particular:

FIG. 90 is a right rear perspective view.

FIG. 91 is a partial top plan view.

FIGS. 92 and 93 illustrate the apparatus of FIG. 87. In particular:

FIG. 92 shares the right front perspective of FIG. 87 and shows the apparatus in the fully extended configuration.

FIG. 93 shares the right rear perspective of FIG. 90 and shows the apparatus in the retracted configuration.

DETAILED DESCRIPTION

While the present invention is susceptible of embodiment in various forms, there are shown in the drawings and will hereinafter be described presently preferred embodiments with the understanding that the present disclosure is to be considered an exemplification of the invention and is not intended to limit the invention to the specific embodiments illustrated.

The embodiments presented are also shown in various forms and shapes and with various optional features. These variations also are exemplifications of the invention and are not intended to limit the combinations of forms, shapes, and optional features.

The aerodynamic performance and efficiency of certain vehicles can be significantly improved by adding streamlining surfaces to the vehicle's rear. In particular, vehicles with blunt rear ends, such as certain over-the-road trucks, over-the-road trailers 101, and sports-utility-vehicles 201 have potential for improved aerodynamics (see FIGS. 2, 25, and 41).

The aerodynamic performance and efficiency of certain vehicles can be significantly improved by filling gaps along the vehicle's length. For example, vehicles with trailers, such as a semi-trailer truck 100 typically have a gap G present between a tractor unit 110 and a semi-trailer 101. Filling the gap G with relatively smooth streamlining surfaces will reduce aerodynamic turbulence and improve aerodynamic performance of the semi-trailer truck 100 (see FIGS. 87 and 88).

Certain vehicles, such as the typical semi-trailer truck 100, can benefit both from adding streamlining surfaces to the rear of the vehicle and by filling gaps along the length of the vehicle.

The present disclosure concerns an aerodynamic drag reducing apparatus 102, 103, 202, 203, 302 suitable for use behind certain vehicles 101, 201 with vertical or near vertical rearward facing surfaces. The aerodynamic drag reducing apparatus 102, 103, 202, 203, 302 serves to streamline the vehicle 101, 201 when in an extended configuration as shown at FIGS. 1 through 4, 25, 26, and 41 through 44. When desired, the aerodynamic drag reducing apparatus 102, 103, 202, 203, 302 can transform into a refracted configuration to save space as shown at FIGS. 10, 13, 32, 33, and 54 through 57. The ability to form two configurations and transform from one to the other without disassembly is made possible by the use of one or more moveable frames 107, 207, 227, 307. Each moveable frame 107, 207, 227, 307 is supported by one or more sets of support linkages 111, 112, 117, 311, 340, 411. The moveable frames 107, 207, 227, 307 support one or more exterior covers 104, 105, 204, 304. The exterior covers 104, 105, 204, 304 provide a gently sloping aerodynamic surface when the aerodynamic drag reducing apparatus 102, 103, 202, 203, 302 is in the extended configuration.

The present disclosure also concerns an aerodynamic drag reducing apparatus 602 suitable for use with certain vehicles 100 having one or more gaps G along the vehicle's 100 length. The aerodynamic drag reducing apparatus 602 serves to streamline the vehicle 100 especially when the vehicle 100 is in a straight configuration, as shown at FIGS. 87 through 89, by filling the gap G. When the vehicle 100 is not in the straight configuration, such as when in a turn or starting up a ramp, portions of the gap G may become smaller as shown at FIGS. 90 and 91. The apparatus 602 accommodates the changing gap G by retracting as needed. Upon the vehicle 100 returning to the straight configuration, the apparatus 602 extends and again fills the gap G. The ability to flexibly conform to the changing gap G is made possible by the use of one or more moveable frames 607. The one or more moveable frame(s) 607 is supported by one or more sets of support linkages 611. The one or more moveable frames 607 support one or more exterior covers 604. The exterior cover(s) 604 provides a filling surface for the gap G and can also provide a transition between the varying shapes of the tractor unit 110 and the semi-trailer 101. Preferably, the cover 604 provides a smooth, gently sloping transition between the tractor unit 110 and the semi-trailer 101. The shapes of the tractor unit 110, the semi-trailer 101, and the apparatus 602 can be designed together in an optimized, complementary, and integrated design.

An attachment frame 109, 206, 306 joins the aerodynamic drag reducing apparatus 102, 103, 202, 203, 302 to the vehicle 101, 201 by serving as a connection point for the first set of support linkages 111, 112, 117, $311_1$, $345_1$, $411_1$. In addition, the attachment frame 109, 206, 306 is connected to or integrated with the vehicle 101, 201. In an example embodiment, illustrated at FIG. 45, a mounting post 310 can be mounted in a hitch receiver of the vehicle 201 and a set of mounting straps 312 can be mounted to a luggage rack of the vehicle 201. In certain embodiments, the exterior cover 104, 105 is attached to the attachment frame 109. In other embodiments, the exterior cover 204, 304 is attached to an adapter fairing 205, 305 placed between the vehicle 201 and the aerodynamic drag reducing apparatus 202, 302. The exterior cover 204, 304 can be attached to the attachment frame 206, 306, and/or the adapter fairing 205, 305, and/or some or all of the moveable frames 107, 207, 227, 307.

The embodiment illustrated at FIGS. 87 through 93 has only a first set of support linkages 611 and only a first moveable frame 607. However, the structure of the above apparatuses 102, 103, 202, 203, 302, including multiple sets of support linkages and multiple moveable frames, can be applied to apparatus 602.

As illustrated at FIGS. 87 through 93, an attachment frame 606 joins the aerodynamic drag reducing apparatus 602 to the tractor unit 110, adjacent the gap G, and serves as a connection point for the first set of support linkages 611. In other embodiments, the first set of support linkages 611 can connect directly to the tractor unit 110. In still other embodiments, the attachment frame 606 can connect to the trailer 101, adjacent the gap G or the first set of support linkages 611 can connect directly to the trailer 101. In certain embodiments, the exterior cover 604 is attached to the attachment frame 606. In other embodiments, the exterior cover 604 is attached to a fairing (not shown) of the tractor unit 110 or the trailer 101. The exterior cover 604 can be attached to the attachment frame 606, and/or the fairing, and/or (certain of) the moveable frame(s) 607.

The moveable frames 107, 207, 227, 307, 607 can take a variety of shapes preferably conforming to or approximately conforming to a shape of the vehicle 100, 101, 201 to which the aerodynamic drag reducing apparatus 102, 103, 202, 203, 302, 602 is attached. For example, FIGS. 5 through 8 and 14 illustrate the moveable frames $107_1$ through $107_5$ which conform to the rectangular shape of the over-the-road trailer/semi-trailer 101. More particularly, the moveable frames $107_{1-5}$ conform to the shape of a door 106 on the trailer 101. In this example, each moveable frame $107_{1-5}$ is paired with an opposite moveable frame $107_{1-5}$ and together the pair of moveable frames $107_{1-5}$ conforms to the shape of the trailer 101. In another example, FIGS. 27 through 30 and 34 illustrate moveable frames $207_{1-7}$ which approximately conform to the shape of the sports-utility-vehicle 201. In still another example, illustrated at FIGS. 45 through 57, moveable frames $307_{1-4}$ more closely approximate the shape of the sports-utility-vehicle 201. As illustrated at FIGS. 87 and 92, the moveable frame 607 and the attachment frame 606 form a transition between the shapes of the tractor unit 110 and the trailer 101. In embodiments where multiple moveable frames 607 are used, each successive moveable frame 607 could form a part of the transition.

Figure 26:
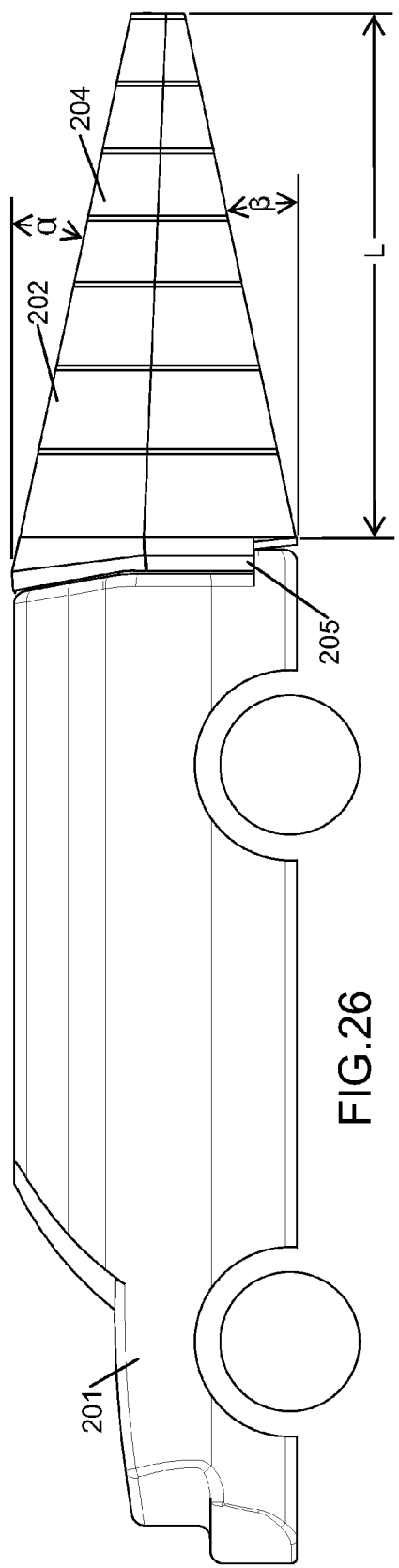
Figure 42:
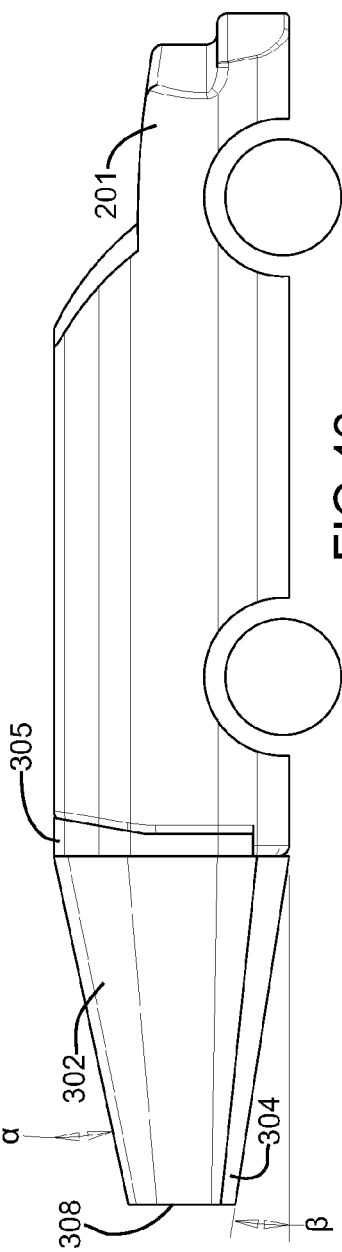
Figure 43:
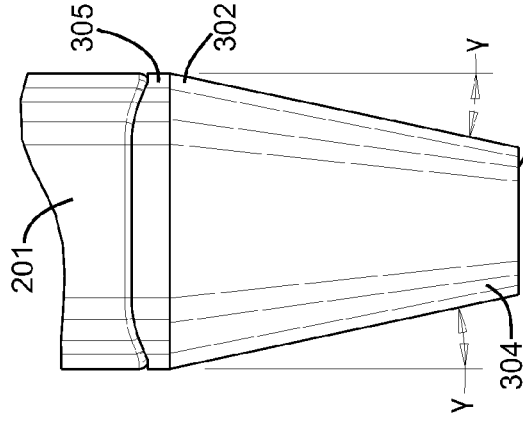
Figure 44:
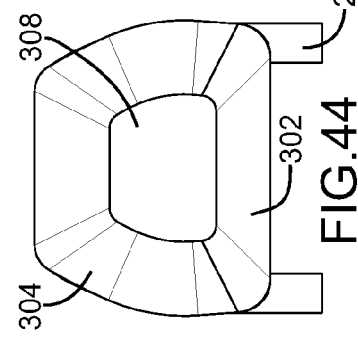
Figure 52:
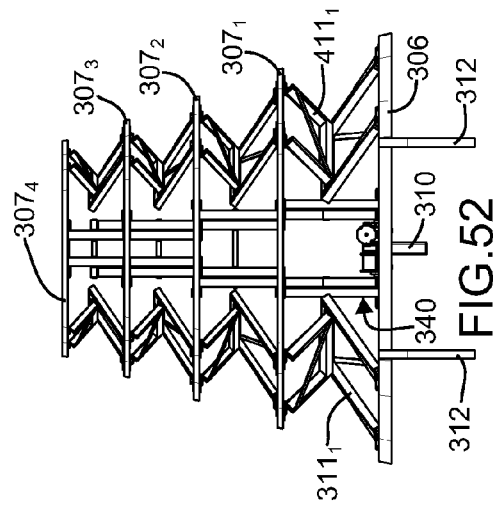
Figure 53:
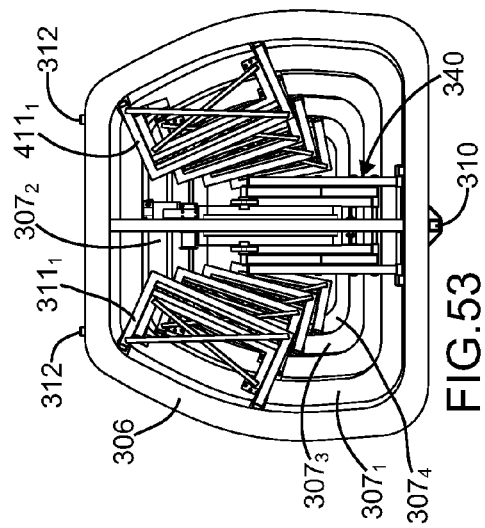
Figure 50:
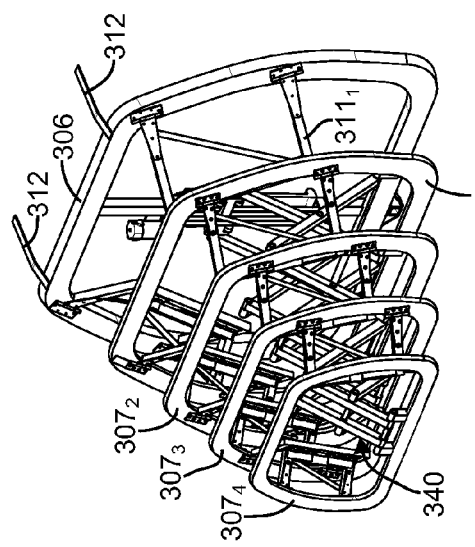
Figure 51:
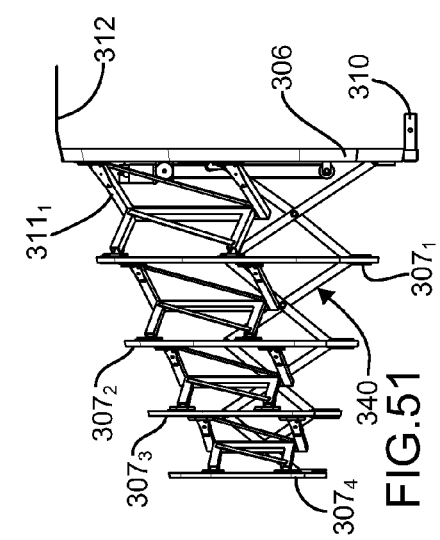
Figure 54:
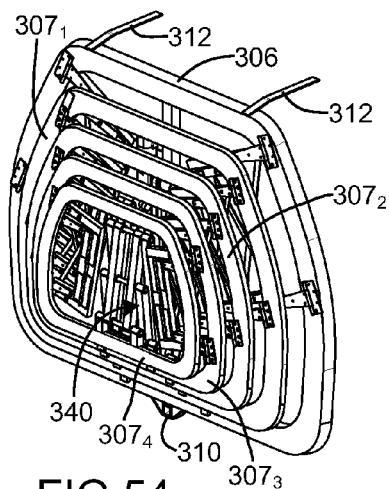
Figure 56:
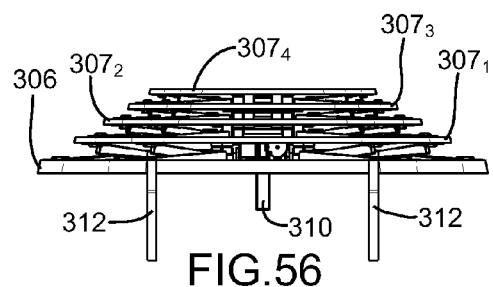
Figure 55:
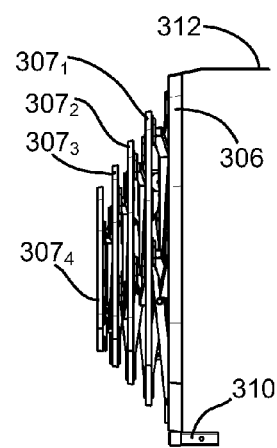
Figure 57:
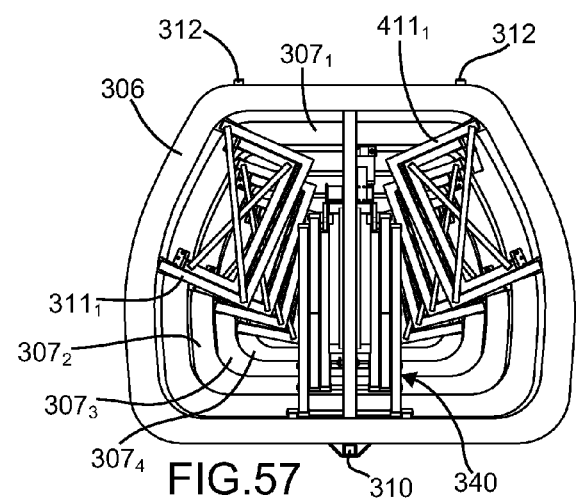
Figure 58:
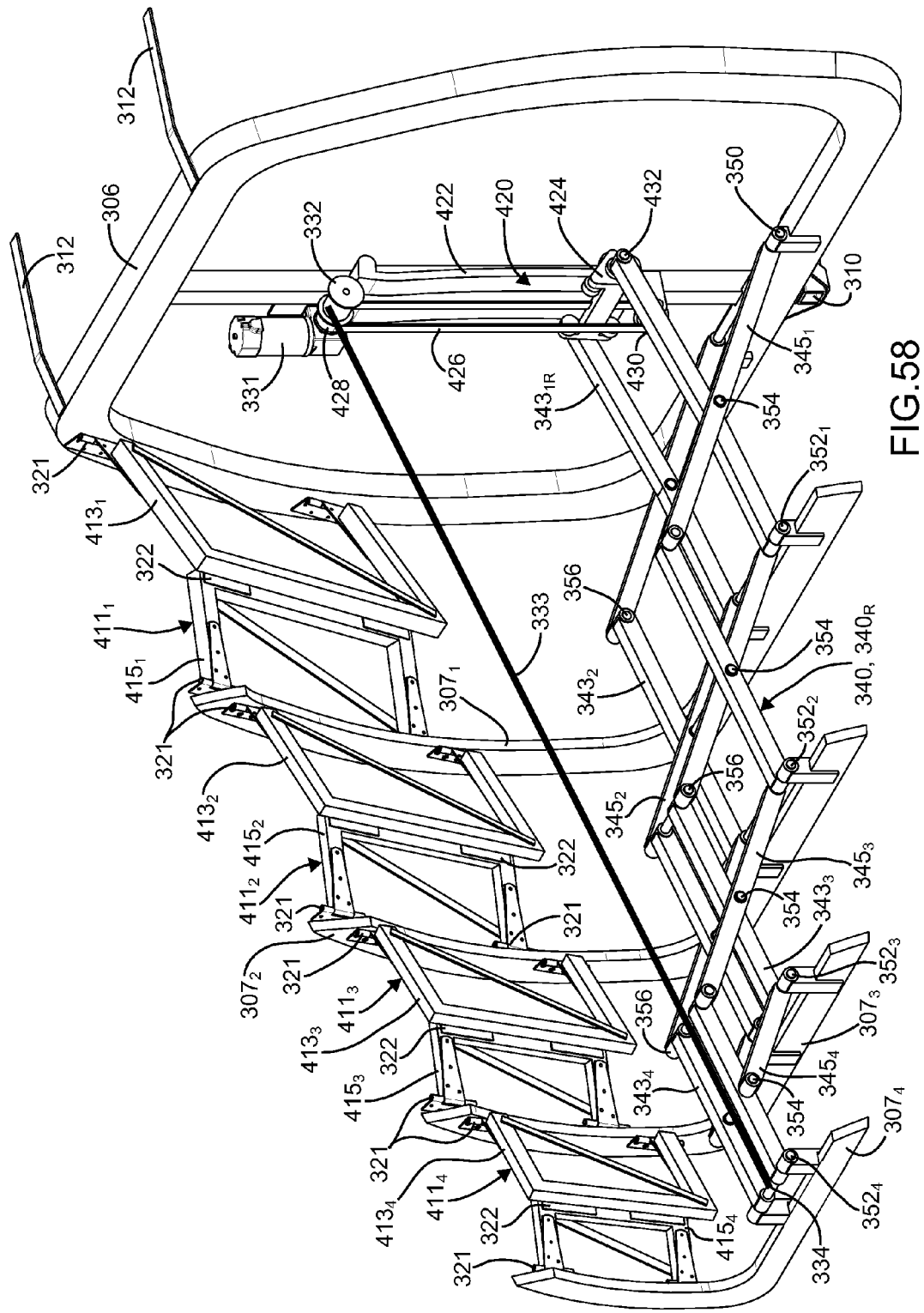
Figure 59:
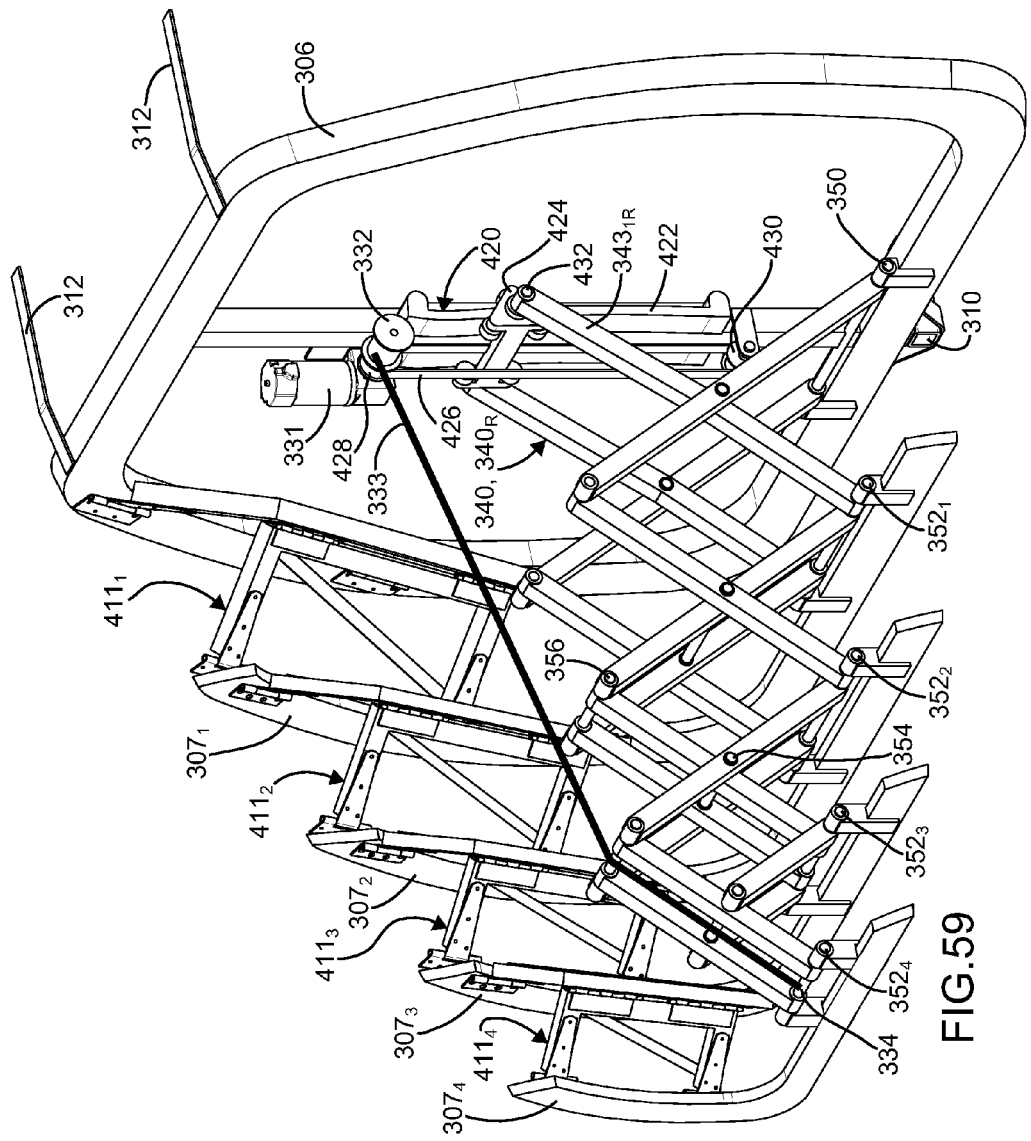
Figure 61:
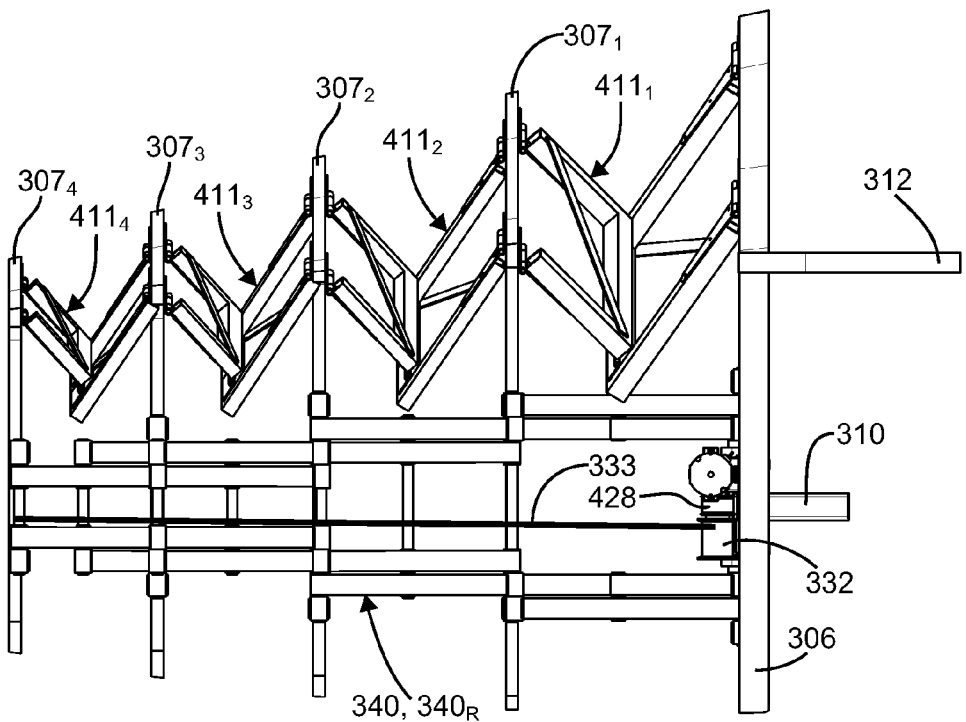
Figure 60:
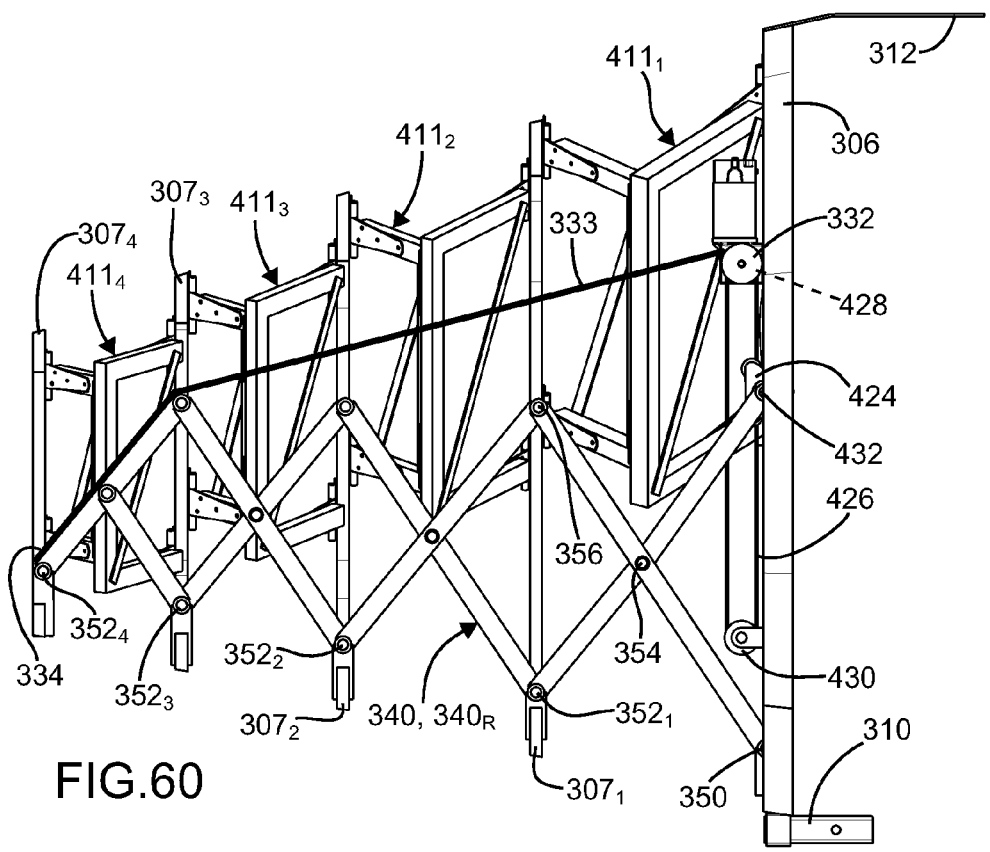
Figure 62:
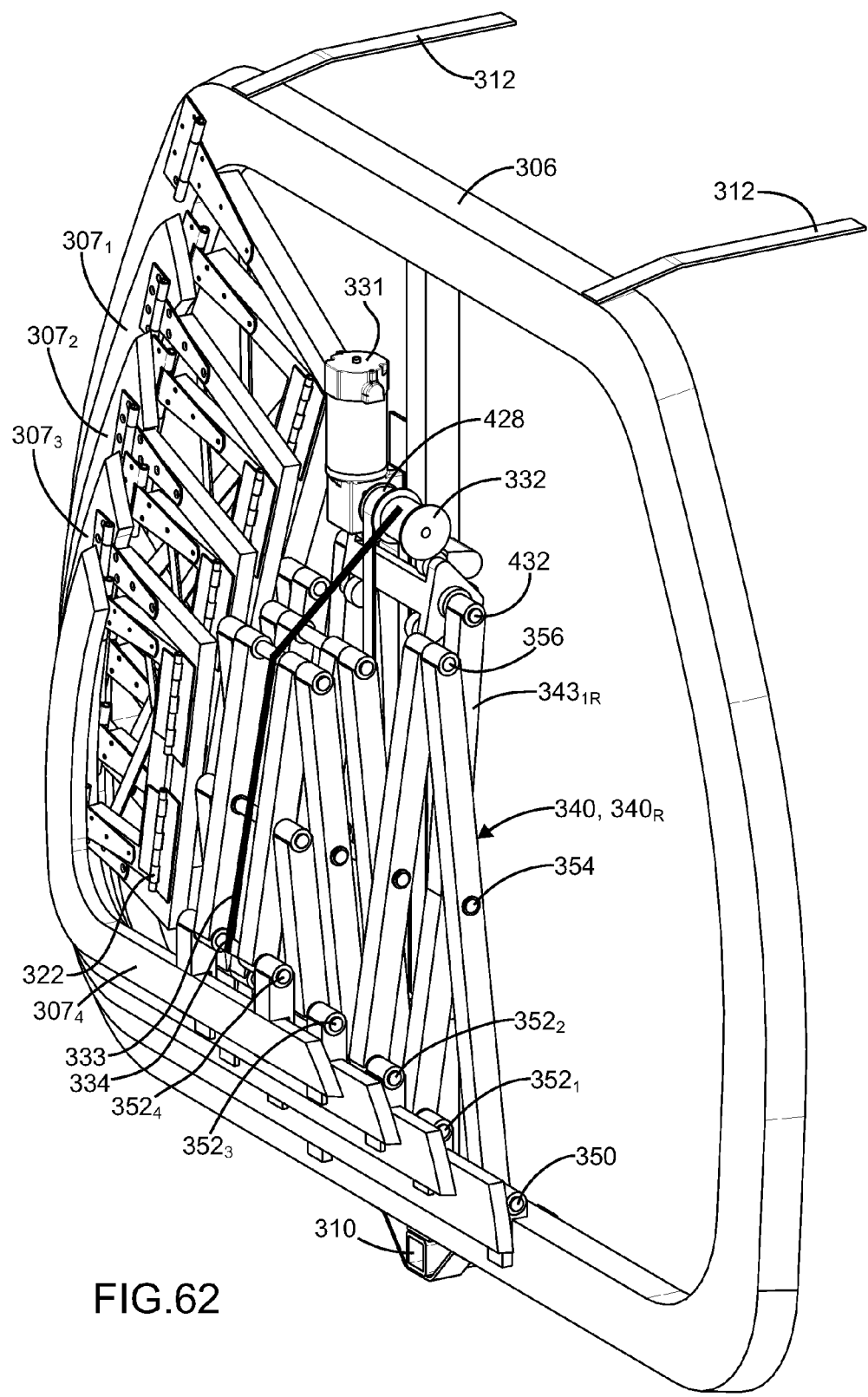
Figure 63:
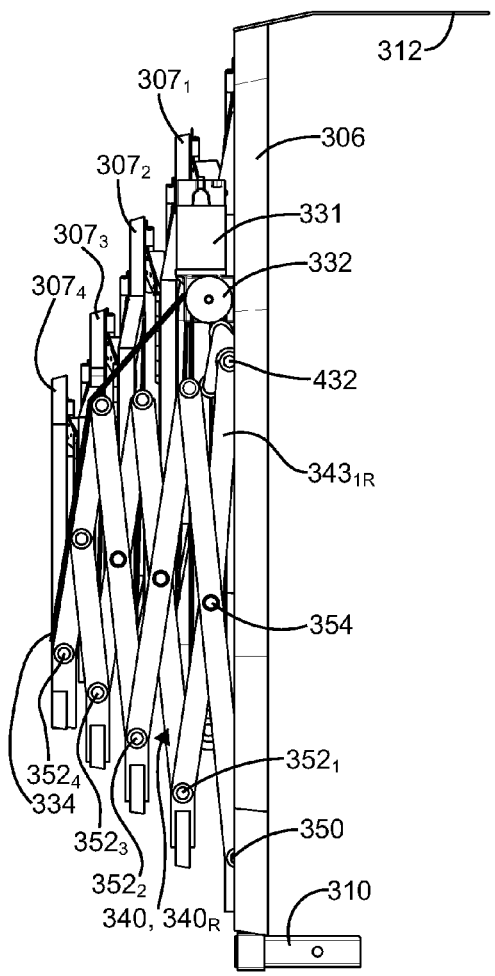
Figure 64:
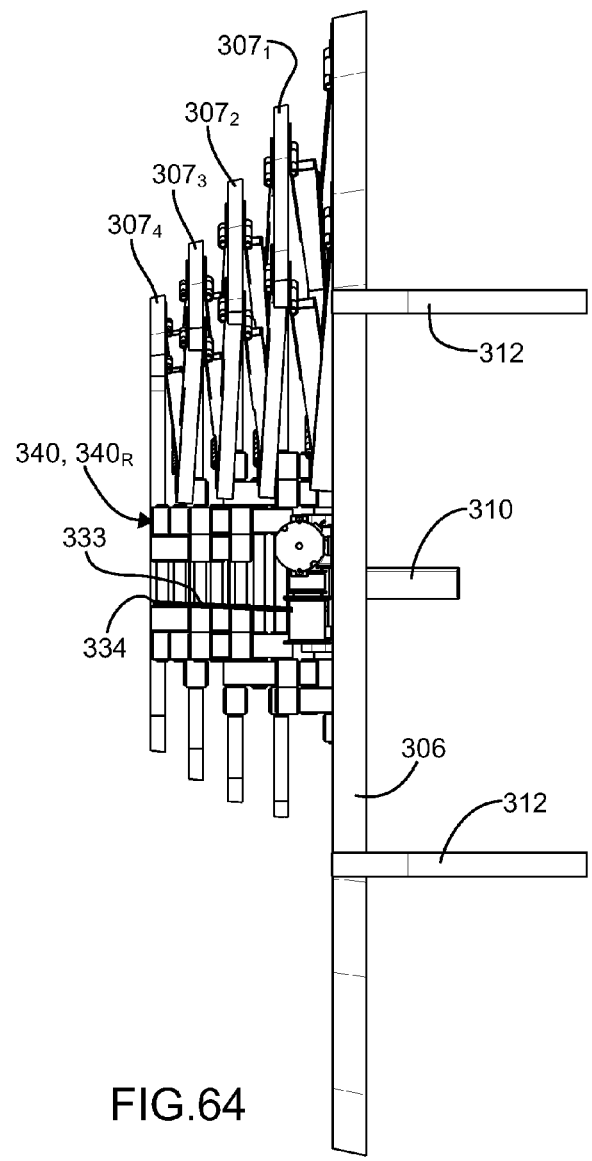
Figure 65:
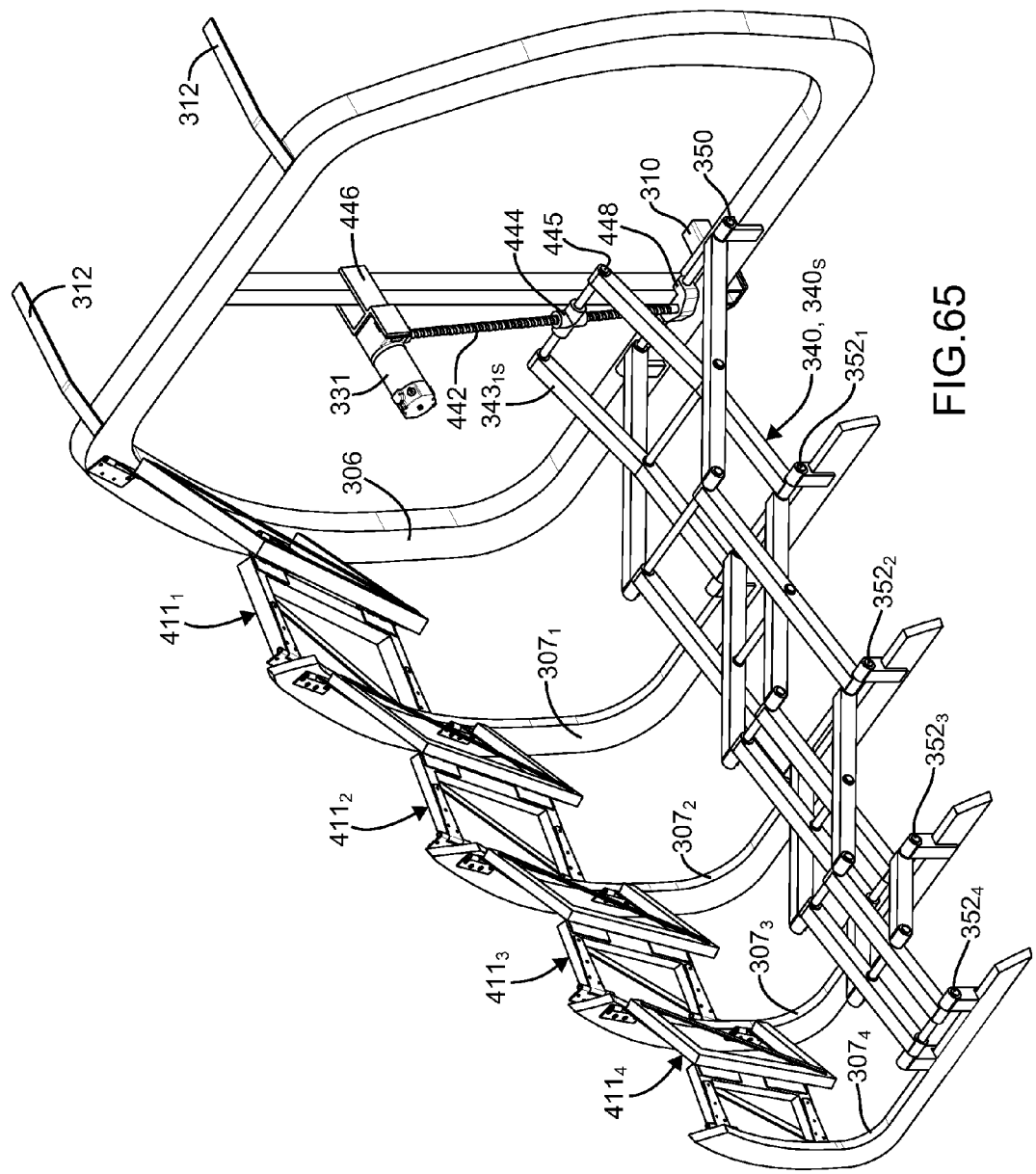
Figure 66:
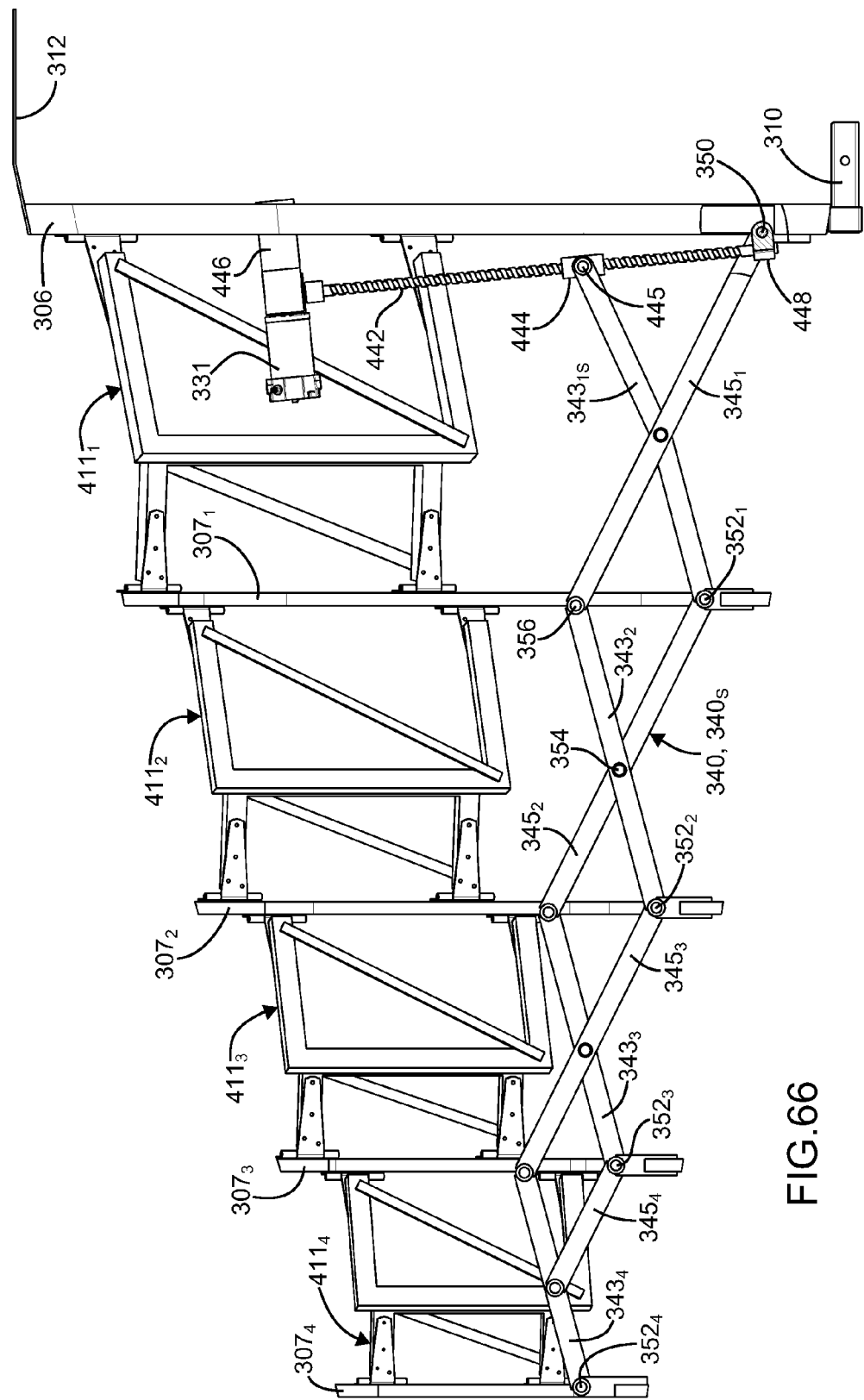
Figure 67:
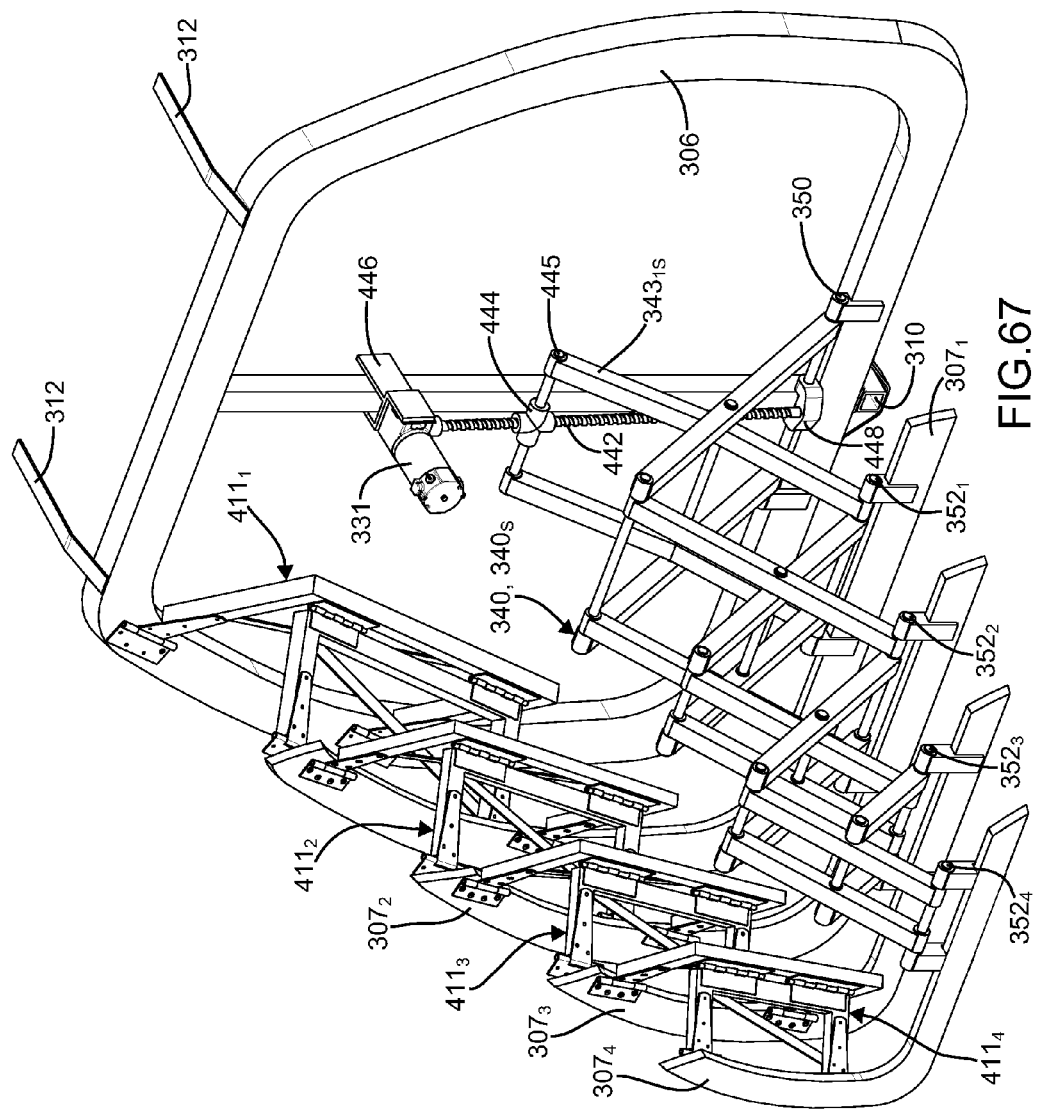
Figure 68:
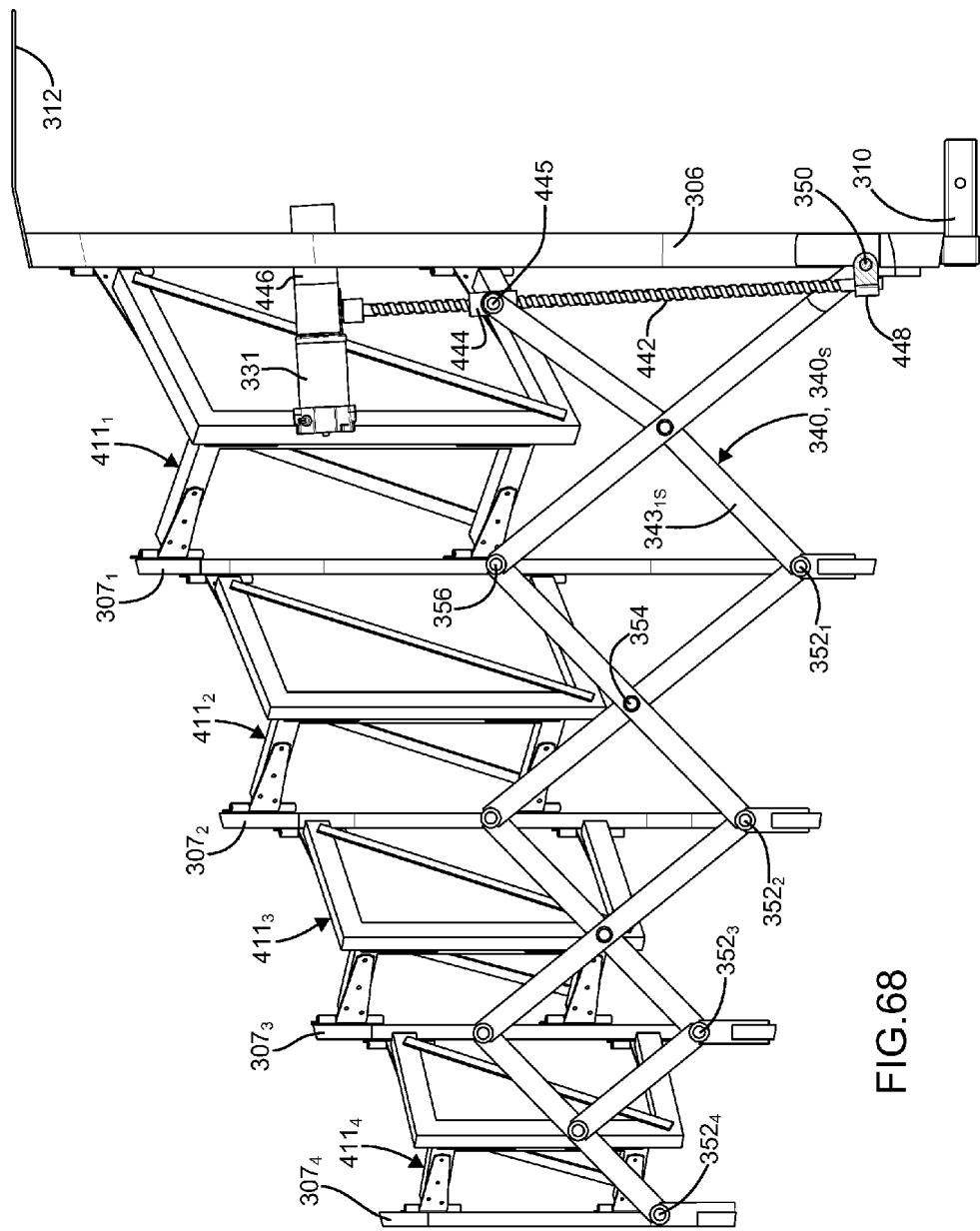
Figure 69:
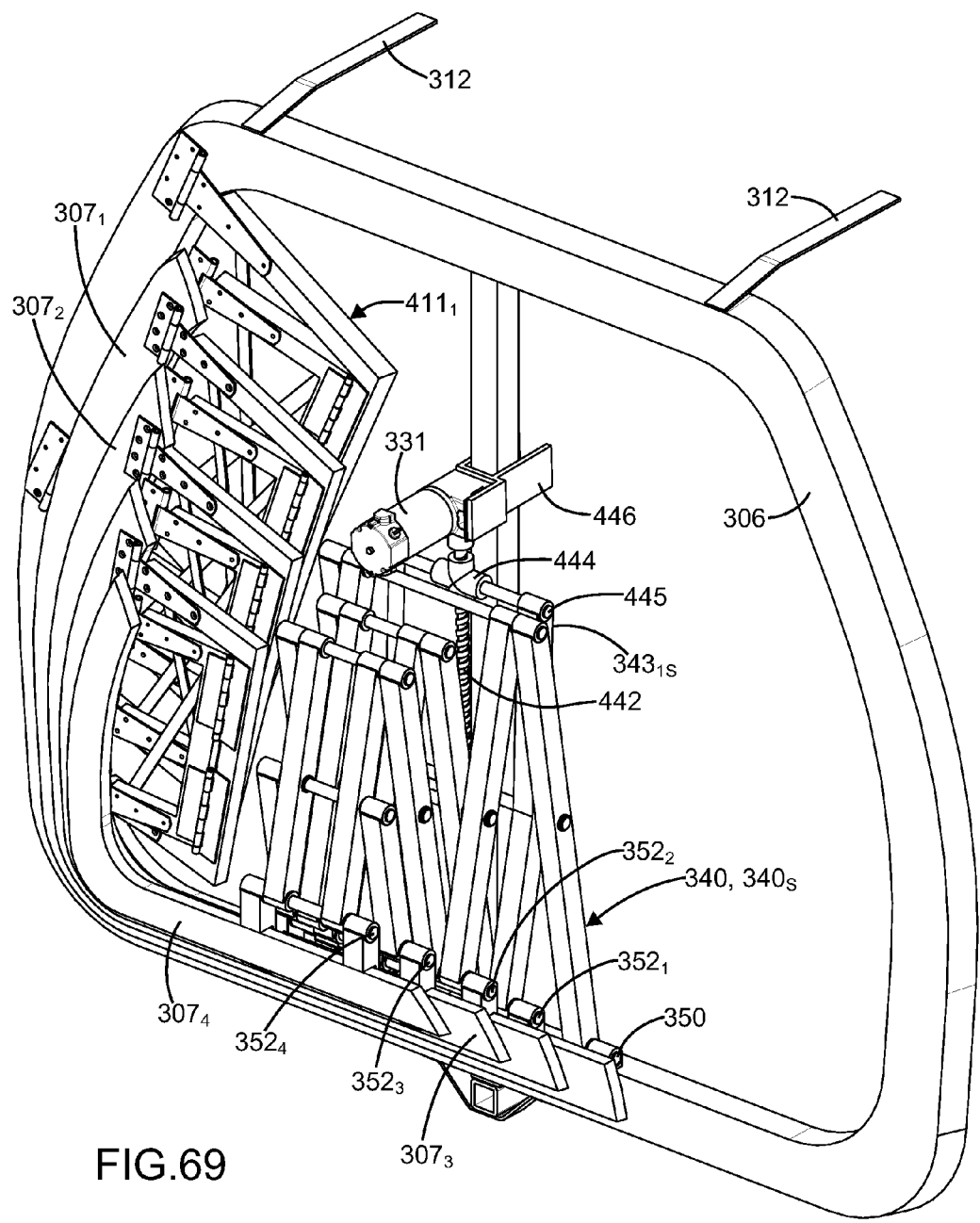
Figure 70:
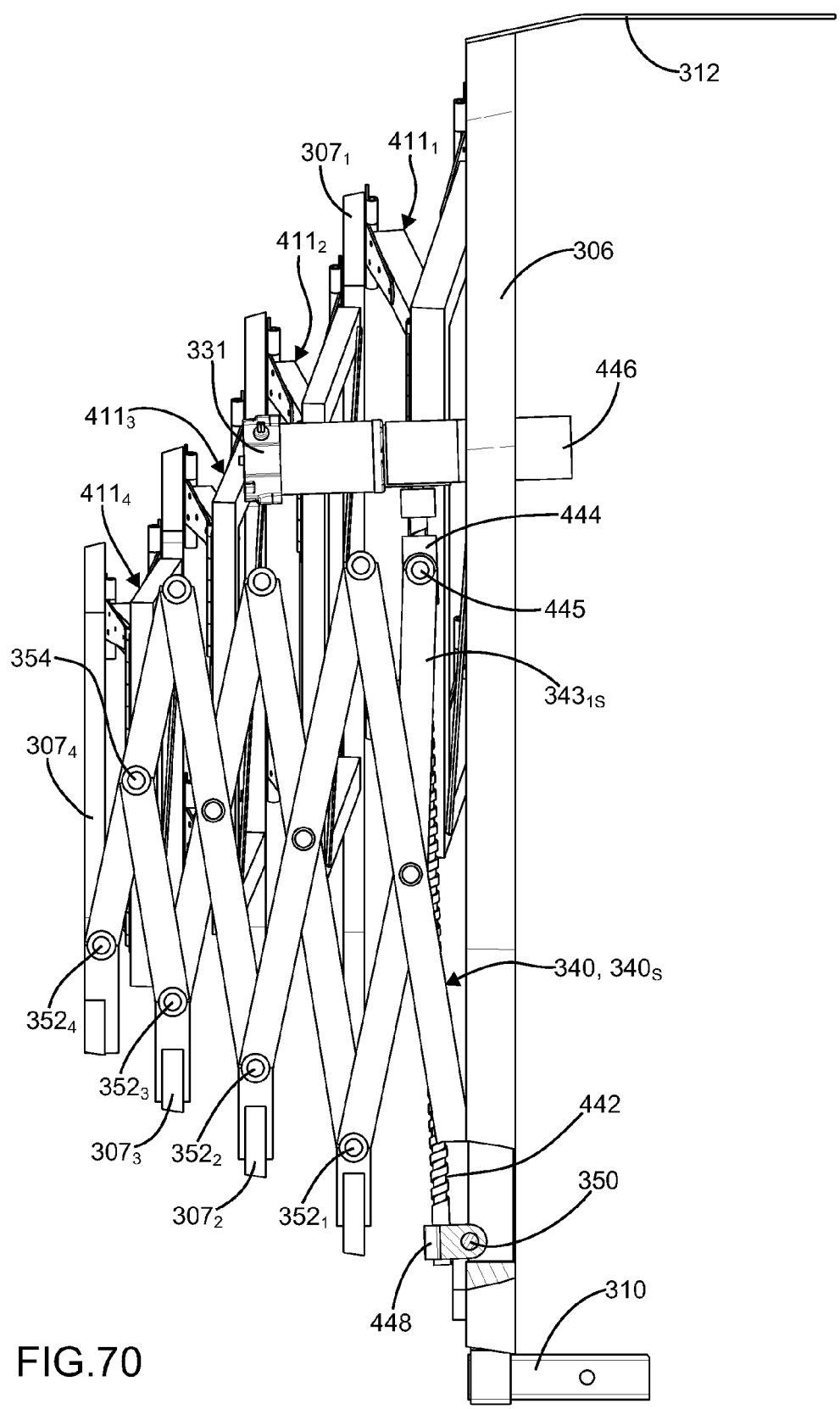
Figure 73:
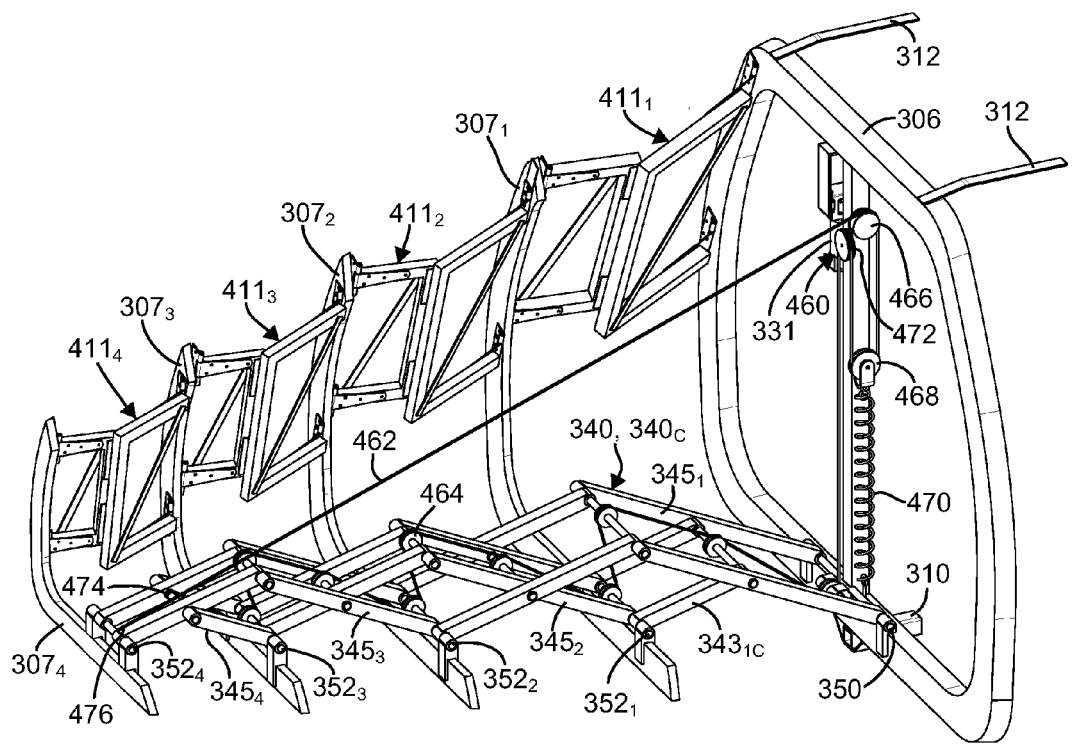
Figure 74:
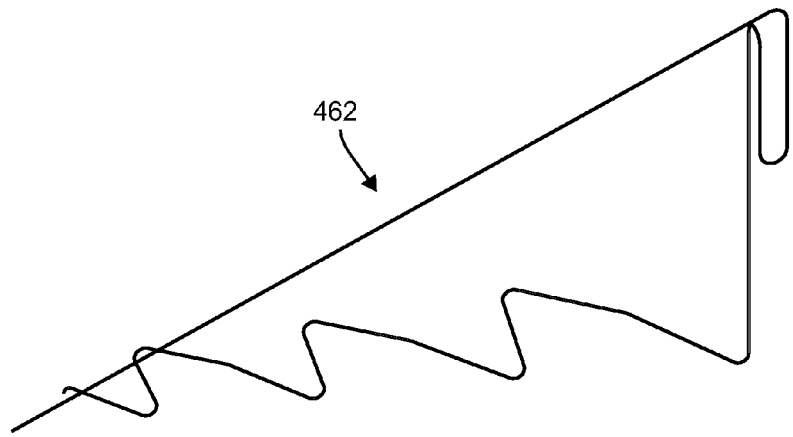
Figure 76:
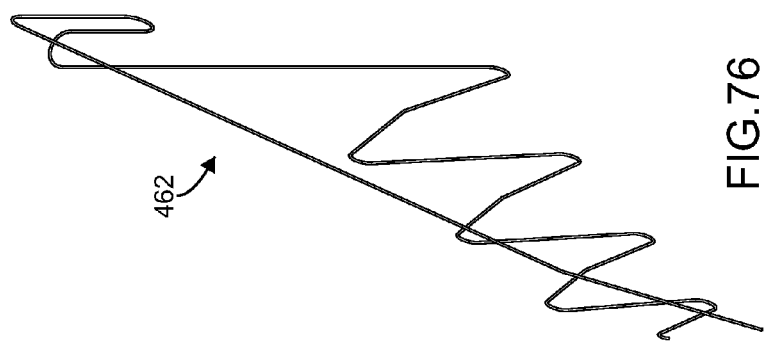
Figure 75:
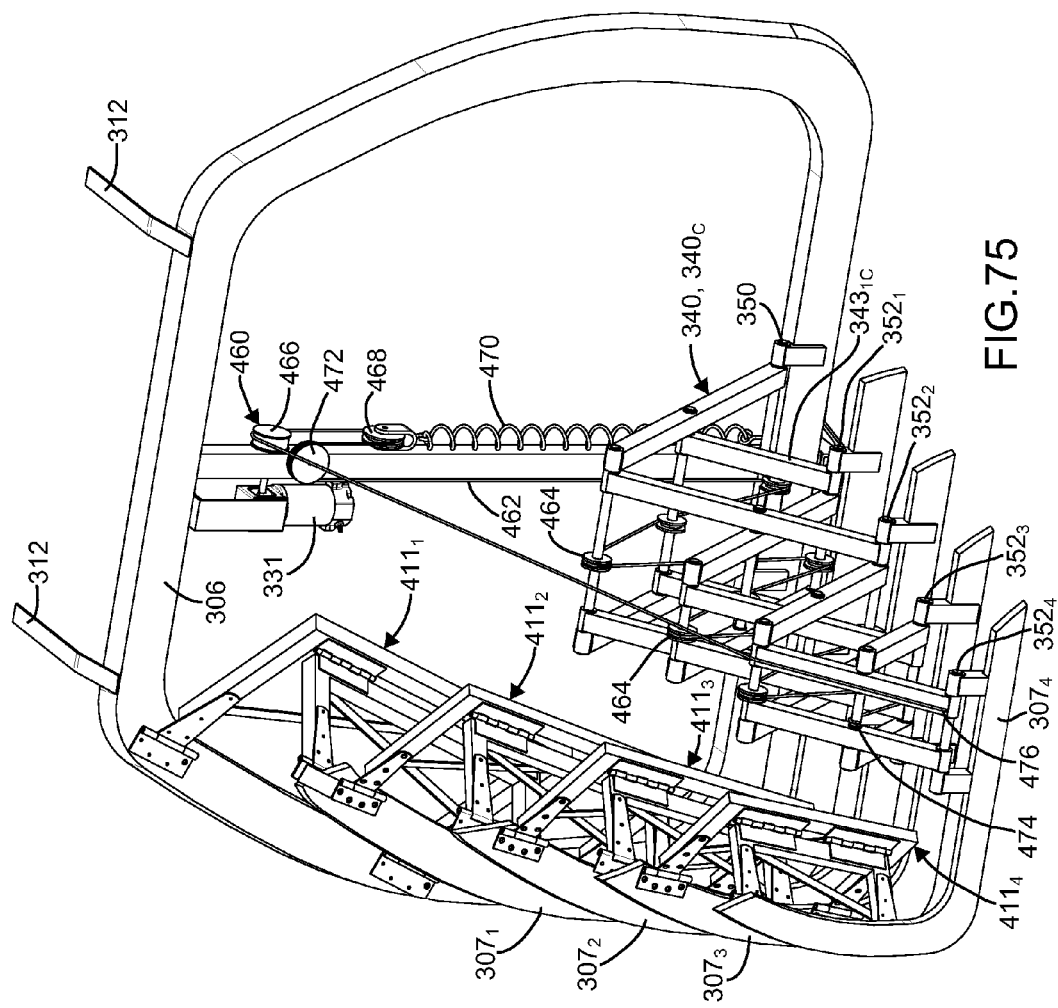
Figure 77:
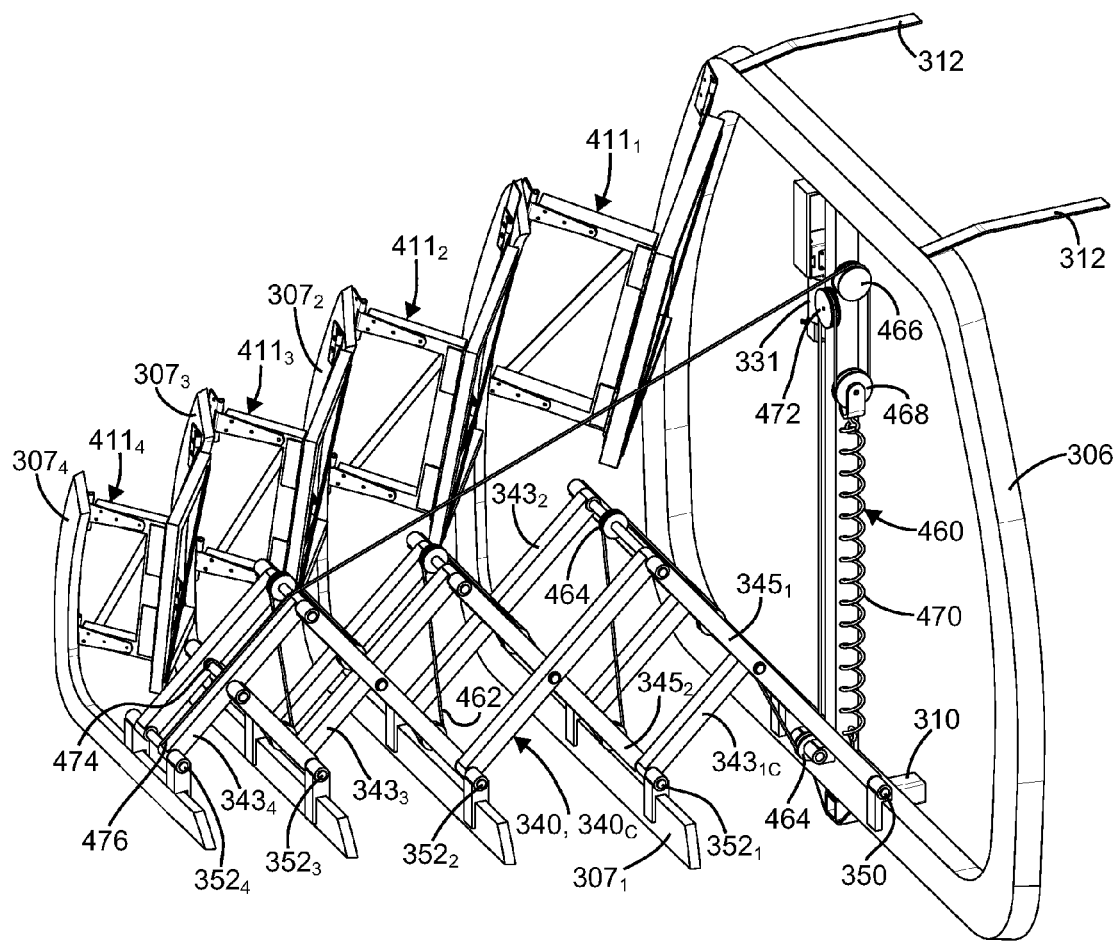
Figure 78:
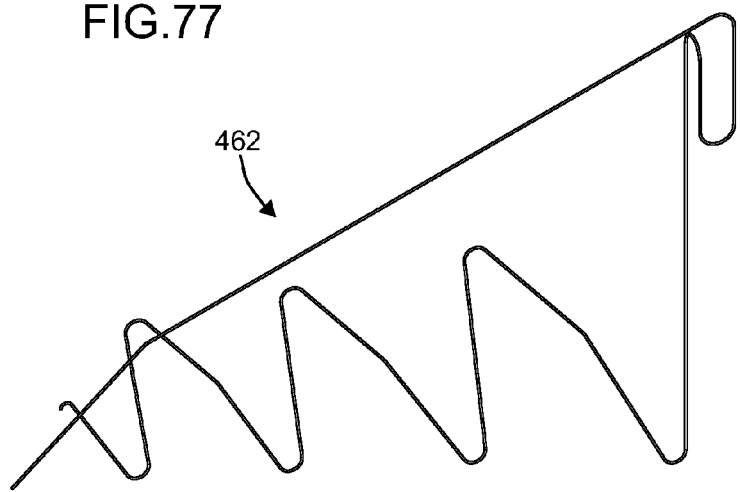
Figures 81, 82:
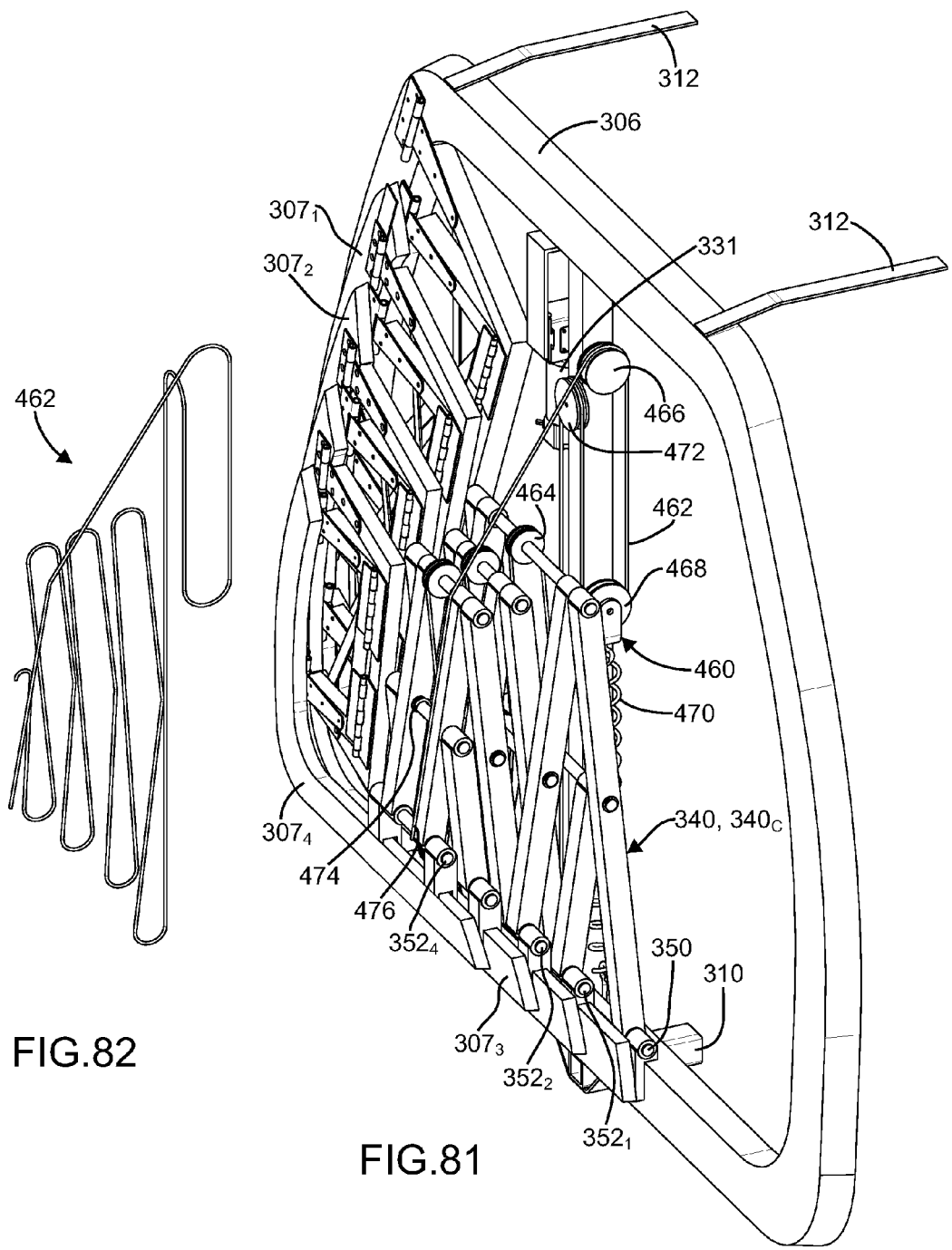
Figure 83:
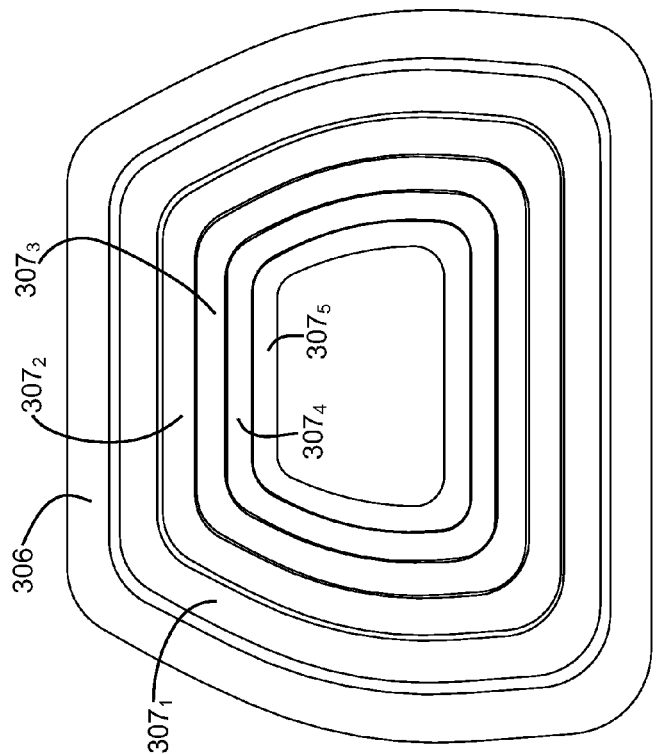

To provide an underlying shape and support for the exterior covers 104, 105, 204, 304 that provide a gently sloping aerodynamic surface behind the vehicle 101, 201, each moveable frame 207, 227, 307 or pair of moveable frames 107 is sized progressively smaller than the preceding moveable frame 107, 207, 227, 307 as illustrated at FIGS. 6, 14, 27, 34, 45, and 46. When in the extended configuration, the collective shape of the moveable frames 107, 207, 227, 307 along with the shape of the attachment frame 109, 206, 306 and/or the adapter fairing 205, 305 defines the overall exterior shape of the aerodynamic drag reducing apparatus 102, 103, 202, 203, 302. In certain embodiments, an angle, α, is defined between a horizontal plane approximately at the top of the vehicle 101, 201 and a top sloping surface of the aerodynamic drag reducing apparatus 102, 103, 202, 203, 302 as illustrated at FIGS. 1, 26, and 42. In certain embodiments the angle, α, varies from zero degrees to 25 degrees. In a preferred embodiment, the angle, α, is between 10 and 15 degrees. Likewise, in certain embodiments, an angle, β, is defined between a horizontal plane approximately at the underside of the vehicle 101, 201 and a bottom sloping surface of the aerodynamic drag reducing apparatus 102, 103, 202, 203, 302 as illustrated at FIGS. 26 and 42. In certain embodiments the angle, β, varies from zero degrees to 25 degrees. In other embodiments, the angle, β, is between zero and 15 degrees or between 5 and 15 degrees. In certain embodiments, an angle, γ, is defined between a vertical plane approximately at the side of the vehicle 101, 201 and a side sloping surface of the aerodynamic drag reducing apparatus 102, 103, 202, 203, 302 as illustrated at FIGS. 3 and 43. In certain embodiments the angle, γ, varies from zero degrees to 25 degrees. In a preferred embodiment, the angle, γ, is between 10 and 15 degrees.

As illustrated at FIGS. 87 through 93, in embodiments of the present disclosure that fill the gap G along the length of the vehicle 100, the exterior cover 604 provides the gap filling surface. The shape of the attachment frame 606 and the moveable frame 607 and the resulting shape of the extended exterior cover 604 blends or approximately blends vehicle surfaces on opposite sides of the gap G. Angles comparable to the angles α, β, and γ of the tail mounted embodiments are chosen to blend the vehicle surfaces across the gap G. In applications where the gap G varies during the operation of the vehicle, such as when the semi-trailer truck 100 executes a turn, the shape and the angles of the extended exterior cover 604 are chosen such that the vehicle surfaces across the gap G are blended during the most common operating conditions (e.g., during straight driving on roads with constant slopes). In certain applications, where the vehicle surfaces across the gap G match each other during typical operation, the angles of the extended exterior cover 604 comparable to the angles α, β, and γ of the tail mounted embodiments are chosen to be zero. In the depicted embodiment of FIGS. 87 through 93, the semi-trailer 101 is larger in cross-section than the tractor unit 110, and the angles of the extended exterior cover 604 result in the apparatus 602 having a down-stream cross-section that is larger than an up-stream cross section.

In certain embodiments, the exterior cover(s) 104, 105, 204 of the fully extended aerodynamic drag reducing apparatus 102, 103, 202, 203 include predominantly planar exterior surfaces. In other embodiments, the exterior surfaces of the exterior cover(s) of the fully extended aerodynamic drag reducing apparatus are non-planar. In still other embodiments, the exterior surfaces of the exterior cover(s) 304, 604 of the fully extended aerodynamic drag reducing apparatus 302, 602 are a mixture of both planar and non-planar surfaces. In preferred embodiments, the exterior surface of the exterior cover(s) 104, 105, 204, 304, 604 is a developable surface (i.e., a surface with zero Gaussian curvature). Thus the exterior surface can be flattened onto a plane without stretching or compressing. Such exterior developable surfaces can therefore be made of planar material that does not easily stretch or compress. In preferred embodiments, the exterior cover(s) 104, 105, 204, 304, 604 are of constant thickness and are developable from planar material without stretching or compressing the planar material. In other embodiments, the exterior cover(s) are piecewise developable and can be made by joining multiple pieces of planar material without stretching or compressing. In still other embodiments, the exterior cover(s) are not developable but can be made by forming (i.e., stretching and/or compressing) material into a non-planar and non-developable shape. In yet other embodiments, the exterior cover(s) are not developable but can be made by tailoring material into a non-planar shape approximation.

The moveable frames 107, 207, 307 of the embodiments illustrated at FIGS. 14, 34, 45, and 46 have a continuous outside perimeter and form a closed, hoop-like structure. In the embodiment illustrated at FIGS. 92 and 93, the moveable frame 607 is "C" or "U" shaped. In still other embodiments, the moveable frames may be "L" shaped. In general, the shape of the moveable frames are tailored to the specific application and does not need to form a closed shape nor does it need to completely define a cross-sectional shape of the aerodynamic drag reducing apparatus.

In certain embodiments having pairs of moveable frames 107, as illustrated at FIG. 6, linking features may be provided which synchronize the movement of the paired moveable frames 107. For example, when the trailer doors 106 are closed, a pin on the right moveable frame 107 may engage a pin hole on the left moveable frame 107 thus linking the movement of the pair of moveable frames 107 when the doors 106 are closed.

Figure 40:
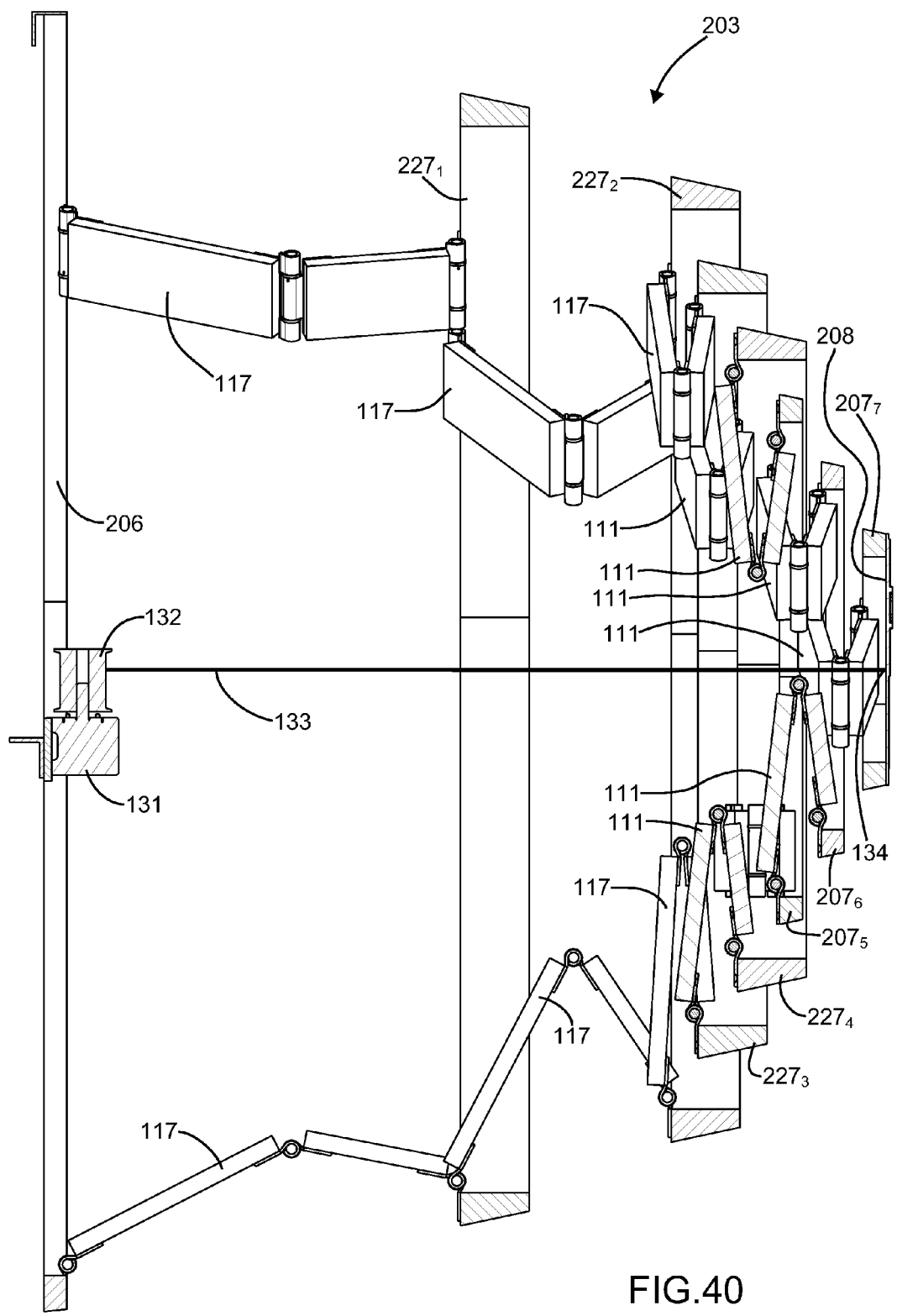
FIG. 40 is a cross-sectional left elevation view cut lengthwise through a partially extended aerodynamic drag reducing apparatus showing the right half of the apparatus with a flexible covering removed and illustrating still another embodiment having certain moveable frames that nest within each other.

In certain embodiments, as illustrated in the example embodiment of FIG. 40, the fourth moveable frame $227_4$ fits within the third moveable frame $227_3$ which fits within the second moveable frame $227_2$ and so on. In such embodiments, the moveable frames 227 may provide a significant portion or the entirety of the exterior of the aerodynamic drag reducing apparatus 203. In certain embodiments, extended moveable frames and optionally an extended adapter fairing may provide the top, bottom, and side surfaces of the extended aerodynamic drag reducing apparatus thus eliminating the need for the exterior cover 204.

In a preferred embodiment, as illustrated at FIGS. 14, 34, 45, and 46, the first moveable frame $107_1$, $207_1$, $307_1$ is supported by the support linkages 111, 112, 117, $311_1$, $411_1$ which in turn are supported by the attachment frame 109, 206, 306. The second moveable frame $107_2$, $207_2$, $307_2$ is supported by the support linkages 111, 112, 117, $311_2$, $411_2$ which in turn are supported by the first moveable frame $107_1$, $207_1$, $307_1$. The third moveable frame $107_3$, $207_3$, $307_3$ is supported by the support linkages 111, 112, 117, $311_3$, $411_3$ which in turn are supported by the second moveable frame $107_2$, $207_2$, $307_2$. The fourth moveable frame $107_4$, $207_4$, $307_4$ is supported by the support linkages 111, 112, 117, $311_4$, $411_4$ which in turn are supported by the third moveable frame $107_3$, $207_3$, $307_3$ and so on. The quantity of the support linkages 111, 112, 117, 311, 411 may vary depending on the space available, the expected loading at the given position, and other reasons. At least two linkages with non-parallel hinge-lines are needed to support a given moveable frame 107, 207, 307. The support linkages 111, 112, 117, 311, 411, the moveable frames 107, 207, 307 and the attachment frame 109, 206, 306 support loads imposed on the apparatus by gravity, airflow, uneven roads, and other operational causes.

In a preferred embodiment illustrated at FIGS. 92 and 93, only one moveable frame 607 is supported by one set of support linkages 611 which, in turn, is supported by the attachment frame 606.

Also illustrated at FIG. 14 are different support linkages 111, 112 supporting the same moveable frame 107. The support linkage 112 has link 114, 116 lengths that are equal as further illustrated at FIG. 22. The support linkage 112 is preferably used across sections of two moveable frames 107 that have no slope between them (i.e., the angles α, β, and/or γ are zero). Conversely, the support linkage 111 has link 113, 115 lengths that are non-equal. The support linkage 111 is preferably used across sections of two moveable frames 107 that have slope between them (i.e., the angles α, β, and/or γ are non-zero). In the case that other slopes are present across sections of two moveable frames, the support linkage joining them can be customized for that particular slope. Tailoring the support linkages in this way allows for a more compact configuration of the aerodynamic drag reducing apparatus 102, 103, 202, 203 when in the fully retracted configuration. In the above discussion of this paragraph, the attachment frame 109 is substituted for one of the moveable frames 107 when the first set of support linkages 111, 112 is involved.

Also illustrated at FIG. 34 are different support linkages 111, 117 supporting different moveable frames 207. The support linkage 117 has longer link lengths than the support linkage 111. The longer support linkage 117 is preferably used to support moveable frames 207 that are separated from the preceding moveable frame 207 by a greater distance. The longer support linkage 117 also requires more interior space when retracted.

In certain embodiments, the support linkages 111, 112, 117 are kept from over-extending by employing joint stops. In other embodiments, a tensile load carrying member restricts the movement of the moveable frames 207 to prevent an overextended configuration from occurring.

Figure 39:
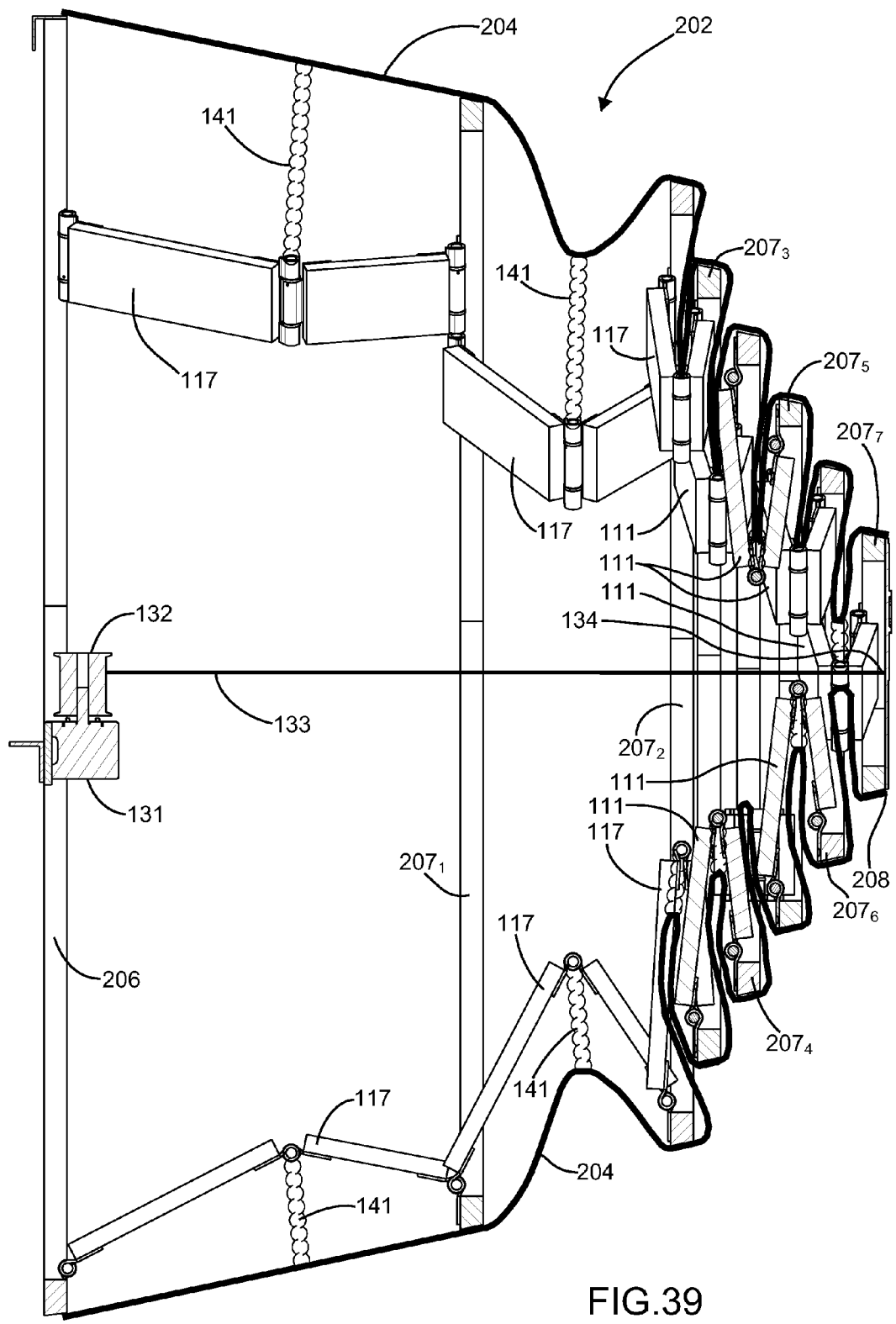

In preferred embodiments, as illustrated at FIG. 39, a flexible fabric material is used for the exterior cover 204. Alternatively, rigid or semi-rigid panels could be used that fold or slide over each other to accommodate the various geometries of the various configurations. The exterior cover 204 may function as the tensile load carrying member of the preceding paragraph. The exterior cover 204 can be urged inward by elastic elements 141 connected at one end to the linkage 111, 117 and at the opposite end to the exterior cover 204. When the apparatus 202 is in the extended configuration, the elastic elements 141 are overpowered by the tension in the exterior cover 204 which is pulled taut. When the apparatus 202 is retracted, the elastic elements 141 urge portions of the exterior cover 204 inward resulting in most of the exterior cover 204 residing within the boundaries of the moveable frames 207.

In certain configurations, an end panel 108, 208, 308 is used to cover the hole within the last moveable frame 107₅, 207₇, 307₄. Alternatively, the last moveable frame 107₅, 207₇, 307₄ can be left open.

In preferred embodiments, as illustrated above, the support linkages 111, 112, 117, 411, 611 have two links 113, 115, 413, 613 and 114, 116, 415, 615, a center hinge 122, 322, 622, and two end hinges 121, 321, 621. In other embodiments, more than two links and three hinges may be used. In still other embodiments, spring elements may be substituted for one or more of the hinges 121, 122, 321, 322, 621, 622. The hinges 121, 122, 321, 322, 621, 622 can have rotatable elements or can be a hinge made of flexible material (e.g., a plastic hinge). Joints of the hinges can be cylindrical or spherical.

In certain embodiments, the hinges 121, 122, 321, 322 are spring loaded to bias the aerodynamic drag reducing apparatus 102, 103, 202, 203, 302 toward the fully extended configuration. As illustrated at FIGS. 14, 34, 40, and 58 a motor 131, 331 driving a pulley 132, 332 reeling a tension-cable 133, 333 terminated at an attachment point 134, 334 to the end panel 108, 208 or the end moveable frame 307₄ is used to overpower the bias and retract the apparatus 102, 103, 202, 203, 302.

In an alternative embodiment, the hinges 121, 122, 321, 322 are spring loaded to bias the aerodynamic drag reducing apparatus 102, 103, 202, 203, 302 toward the fully refracted configuration. The partial vacuum present when the vehicle exceeds a given speed overpowers the bias and the apparatus 102, 103, 202, 203, 302 extends.

In still another embodiment, the exterior cover 104, 304 is sufficiently airtight to allow compressed air delivered within the aerodynamic drag reducing apparatus 102, 103, 202, 203, 302 to extend the apparatus 102, 103, 202, 203, 302. Conversely a partial vacuum within the apparatus 102, 103, 202, 203, 302 can be used to retract the apparatus 102, 103, 202, 203, 302.

In the embodiment depicted at FIGS. 87 through 93, the hinges 621, 622 are biased to extend the apparatus 602 and are held from overextending the apparatus 602 by the cover 604 becoming taut between the frames 606, 607. As shown at FIGS. 90 and 91, bearing loads applied by a corner of the trailer 101 can retract the extension biased apparatus 602 when the semi-trailer truck 100 is executing a turn, is on an uneven road, etc. In this case, movement of the semi-trailer truck 100 causes a portion of the gap G to become smaller and cause the corner to bear against the apparatus 602 and overpower the extension bias thus causing the apparatus 602 to at least partially retract. The extension bias returns the apparatus 602 to the extended configuration as the gap G expands when the semi-trailer truck 100 returns to a straight course, as shown at FIGS. 87 through 90. The other methods described in the present disclosure can also be used to retract and extend the apparatus 602 when flexibly filling the gap G.

In certain embodiments of the present disclosure, illustrated at FIGS. 41 through 82, a scissors linkage 340, 340$_R$, 340$_S$, 340$_C$, is provided. As illustrated, the scissors linkage 340, 340$_R$, 340$_S$, 340$_C$ provides lateral support for side loads applied on the aerodynamic drag reducing apparatus 302. In addition, the scissors linkage 340, 340$_R$, 340$_S$, 340$_C$ can provide a means for extending the apparatus 302. Certain forms of the scissors linkage 340$_R$, 340$_S$ also provide a means for retracting the apparatus 302. A first link 345$_1$ of the scissors linkage 340, 340$_R$, 340$_S$, 340$_C$ is rotatably connected to the attachment frame 306 at a frame mount 350.

In addition to providing lateral support, certain forms of the scissors linkage 340$_R$ can also provide vertical support. In the embodiment illustrated at FIGS. 45 through 64, an actuator 420 includes a guide rail 422, a cam follower 424 slidably attached to the guide rail 422, a drive belt 426 that drives the cam follower 424, a first pulley 428, a second pulley 430, a motor 331, and a pivoting connection 432. The drive belt 426 is preferably routed between the first pulley 428 and the second pulley 430. The motor 331 is rotatably connected to the first pulley 428 and thereby connected to the drive belt 426. The motor 331 can therefore raise and lower the cam follower 424. The pivoting connection 432 is mounted on the cam follower 424 and also is rotatably connected to the scissor linkage 340$_R$. Running the motor 331 in a first rotational direction therefore extends the scissor linkage 340$_R$ and therefore extends the apparatus 302. Running the motor 331 in a second rotational direction therefore retracts the scissor linkage 340$_R$ and therefore retracts the apparatus 302.

In certain embodiments, a cable pulley 332 in cooperation with a tension-cable 333 may assist the scissors linkage 340$_R$ in the retraction of the apparatus 302. The cable pulley 332 and the first pulley 428 may be driven by the same motor 331 or by separate motors. If driven by the same motor 331, a differential gearbox (e.g., a planetary gearbox) may rotationally connect to each of the pulleys 332, 428 and the motor 331 to variably distribute the torque and speed of the motor 331 to each of the pulleys when retracting the apparatus. In particular, the rotational speed of the motor 331 can be geared down and a torque balance between the motor 331, the cable pulley 332, and the first pulley 428 is established by the gearing. During the retraction of the apparatus 302, the relative rotational speeds between the cable pulley 332 and the first pulley 428 may change due to the kinematics of the scissors linkage $340_R$ and the apparatus 302. The torque balance between the cable pulley 332 and the first pulley 428 is maintained during the retraction of the apparatus 302 even though the relative rotational speeds between the cable pulley 332 and the first pulley 428 change. This allows both the tension-cable 333 and the scissors linkage $340_R$ to continuously contribute to the retraction of the apparatus 302 during the retraction of the apparatus 302 powered by the same motor 331.

As mentioned above, the scissors linkage $340_R$ can also provide vertical support to the apparatus 302. The support can be provided at rotational joints between a frame mount $352_1$ and the moveable frame $307_1$, a frame mount $352_2$ and the moveable frame $307_2$, a frame mount $352_3$ and the moveable frame $307_3$, and a frame mount $352_4$ and the moveable frame $307_4$.

The support provided by the scissors linkage $340_R$ can bind with the support provided by the support linkages $311_{1-4}$, $411_{1-4}$. In one example, an extension-retraction path of the support linkages $311_{1-4}$, $411_{1-4}$ is horizontal and linear while an extension-retraction path of a scissors linkage similar to the scissors linkage $340_R$ is approximately horizontal but is not linear. The scissors linkage $340_R$ resolves this by employing a curved guide rail as the guide rail 422. The curved guide rail is matched to the kinematics of the scissors linkage $340_R$ and the support linkages $311_{1-4}$, $411_{1-4}$.

An alternative embodiment of the present disclosure removes the support linkages $311_{1-4}$, $411_{1-4}$, featured at FIGS. 45 through 64, and supports the aerodynamic drag reducing apparatus 302 with the scissors linkage $340_R$. The tension-cable 333, as illustrated at FIGS. 58 through 64, can optionally assist the scissors linkage $340_R$ in the support of the apparatus 302. By removing the support linkages $311_{1-4}$, $411_{1-4}$, the potential for them binding with the scissors linkage $340_R$ is removed and a linear guide rail can be used as the guide rail 422. In the present alternative embodiment, the moveable frames $307_{1-4}$ are connected to the frame mounts $352_{1-4}$, as previously described. In addition, the moveable frames $307_{1-4}$ are preferably connected to the exterior cover 304. An additional connection, such as a sliding connection, can be added between each of the moveable frames $307_{1-4}$ and a corresponding upper pivot 356 or a corresponding mid-pivot 354 of the scissors linkage $340_R$.

Yet another alternative embodiment of the present disclosure removes the support linkages $311_{1-4}$, $411_{1-4}$ and the moveable frames $307_{1-3}$, featured at FIGS. 45 through 64, and supports the aerodynamic drag reducing apparatus 302 with the scissors linkage $340_R$. The tension-cable 333, as illustrated at FIGS. 58 through 64, can optionally assist the scissors linkage $340_R$ in the support of the apparatus 302. In the present alternative embodiment, the scissors linkage $340_R$ pushes outwardly on, vertically supports, and laterally supports the last (and only) moveable frame $307_4$ and the exterior cover 304 pulls against the moveable frame $307_4$ when the aerodynamic drag reducing apparatus 302 is fully extended. Thus, in the fully extended configuration, the compressive loads within the scissors linkage $340_R$ are at least partially balanced by the tensile loads of the exterior cover 304 resulting in a stable configuration. In the fully extended configuration, the tensile loads within the exterior cover 304, the compressive loads within the scissors linkage $340_R$, other loads (e.g., bending) within the scissors linkage $340_R$, and the attachment frame 306 support the exterior cover 304. When partially or fully retracted, the scissors linkage $340_R$ supports a rear end of the exterior cover 304 via the moveable frame $307_4$, and the attachment frame 306 supports a front end of the exterior cover 304. Support straps (not shown) can be added between various points of the scissors linkage $340_R$ and the exterior cover 304 to keep the cover 304 from reaching the ground when not fully extended. The support straps can be stretchable or non-stretchable.

In another embodiment, illustrated at FIGS. 65 through 70, the scissor linkage $340_S$ extends and retracts the apparatus 302 by employing a screw drive including the motor 331, a drive screw 442, a pivoting drive nut 444, an anti-rotation means 446, and a base pivot 448. The base pivot 448 is rotatably connected to the attachment frame 306. The pivoting drive nut 444 is rotatably connected to an upper pivot 445 of a second link $343_{1S}$ of the scissor linkage $340_S$. An output shaft of the motor 331 is rotationally connected to the drive screw 442, and a housing of the motor 331 is held from rotating with the output shaft by the anti-rotation means 446. The drive screw 442 is threadingly connected to the pivoting drive nut 444 and rotatably connected to the base pivot 448. When the motor 331 rotates in a first direction, the drive screw 442 pushes the pivoting drive nut 444 away from the base pivot 448 thereby retracting the scissor linkage $340_S$. When the motor 331 rotates in a second direction, the drive screw 442 pulls the pivoting drive nut 444 towards the base pivot 448 thereby extending the scissor linkage $340_S$.

In still another embodiment, illustrated at FIGS. 71 through 82, still another scissors linkage $340_C$ extends the apparatus 302. In this embodiment, a tension-cable 462 is routed across pulleys 464 that are rotatably mounted on the scissors linkage $340_C$. In the depicted embodiment, the pulleys 464 are co-axial with certain of the pivoting joints of the scissors linkage $340_C$. Also in the depicted embodiment, a first end of the tension-cable 462 is attached to an attachment point 476 that is connected to the last moveable frame $307_4$, and a second end of the tension-cable 462 is attached to an attachment point 474 that is connected to a last scissors link $343_4$. A cable drive 460 includes the motor 331, a drive pulley 466, a first idler pulley 468, a second idler pulley 472, and a tension spring 470. When the motor 331 rotates the drive pulley 466 in a first direction, the tension-cable 462 pulls against certain pulleys 464 attached to the joints of the scissors linkage $340_C$ drawing them together and thereby extending the scissors linkage $340_C$ and the apparatus 302. When the motor 331 rotates the drive pulley 466 in a second direction, the tension-cable 462 pulls the attachment point 476 inward and thereby directly retracts the scissors linkage $340_C$ and the apparatus 302. As the apparatus 302 extends and retracts, a length of the tension-cable 462 route through the scissors linkage $340_C$ and to the attachment point 476 changes. The first idler pulley 468 and spring 470 allow the length of the tension-cable 462 route to vary and keep adequate tension in the tension-cable 462. In alternative embodiments, some or all of the pulleys 464 may not be co-axial with certain of the pivoting joints of the scissors linkage $340_C$, and/or the attachment points 474, 476 can be connected to other points on the scissors linkage $340_C$.

The tension-cable 333, 462 can provide a vertical component of support for the apparatus 302.

The scissors linkage 340, $340_R$, $340_S$, $340_C$ preferably are connected at joints to each of the moveable frames 307.

In the above embodiments, illustrated at FIGS. 41 through 86, the support linkages $311_{1-4}$ are essentially a mirror image of their corresponding support linkage $411_{1-4}$.

Figure 85:
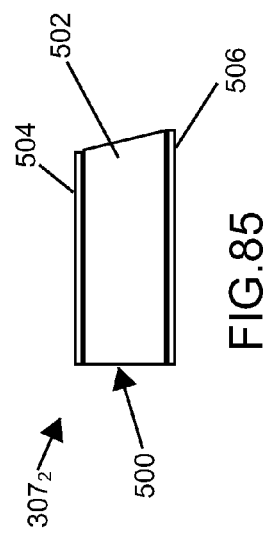
Figure 84:
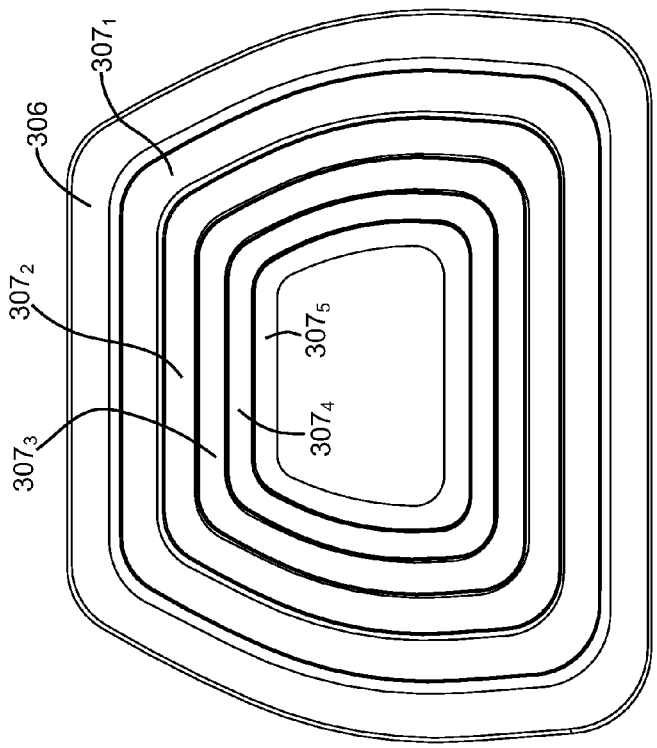
Figure 86:
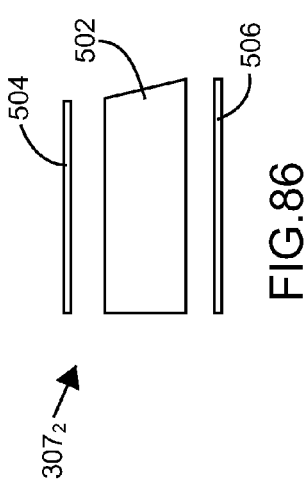

FIGS. 83 through 86 illustrate a method of constructing the moveable frames $307_{1-4}$ and further illustrate the possibility of additional moveable frames (e.g., moveable frame $307_5$). In particular, in certain embodiments, all of the moveable frames $307_{1-5}$ can be made from a single sheet of planar material by nesting them as illustrated at FIGS. 84 and 85. In certain embodiments, the planar material can be a honeycomb sandwich structure. In other embodiments, the planar material can be a composite material. In still other embodiments, the planar material 500 can include a core material 502 sandwiched by skins 504, 506. In one embodiment, the core material 502 is lightweight marine plywood and the skins 504, 506 are aluminum sheet. As further illustrated at FIGS. 83 through 86, an outer perimeter of the moveable frames $307_{1-5}$ can be angled to match the exterior shape of the aerodynamic drag reducing apparatus 302.

In yet other embodiments, the moveable frames are not planar.

The various extension/retraction methods of the various embodiments may be combined in various ways to create new embodiments.

Latches or similar devices may be use to keep the aerodynamic drag reducing apparatus 102, 103, 202, 203, 302 in a given configuration.

In certain embodiments of the present disclosure, certain support linkages and/or moveable frames may deform from one configuration to the next or while transitioning between configurations. This deformation will cause forces and moments to develop within the apparatus. These forces and moments may be employed to keep the apparatus stable in one or more configurations.

Figure 25:
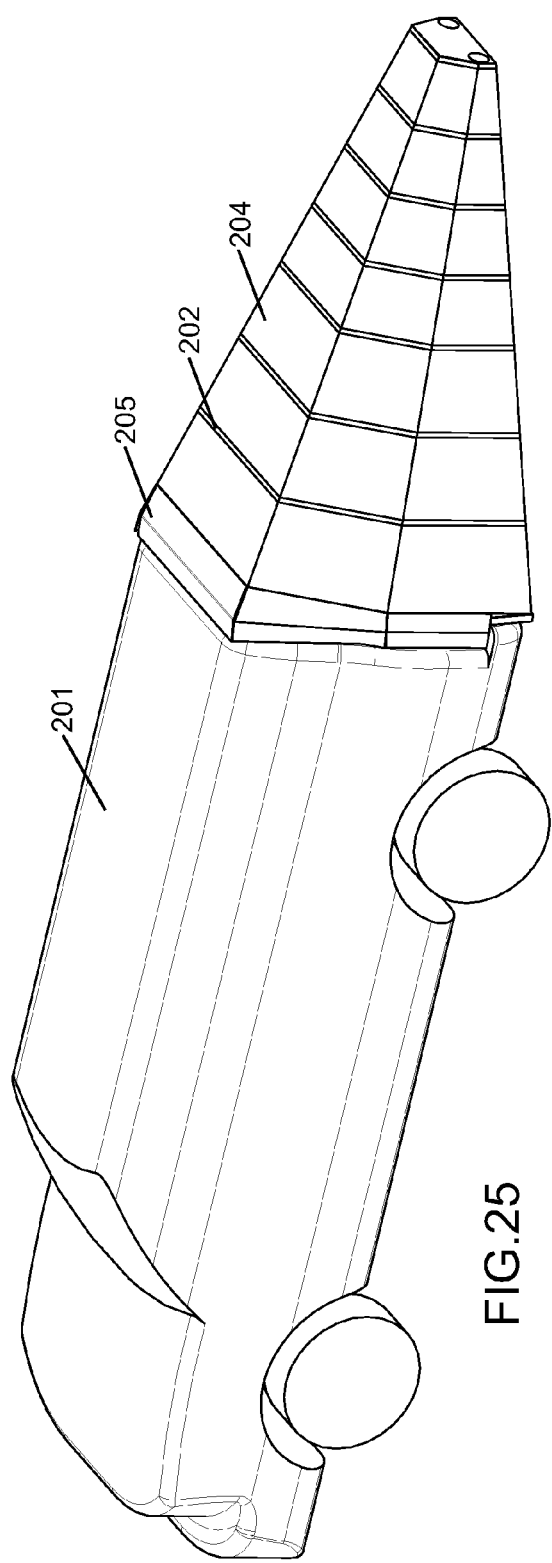
Figure 29:
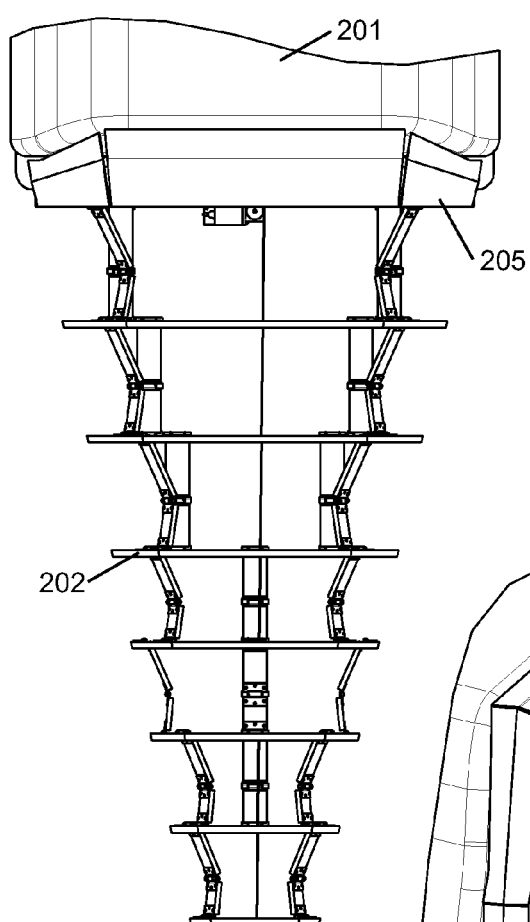
Figure 32:
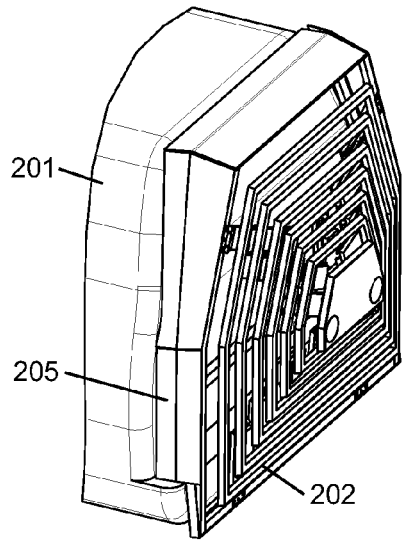
Figure 31:
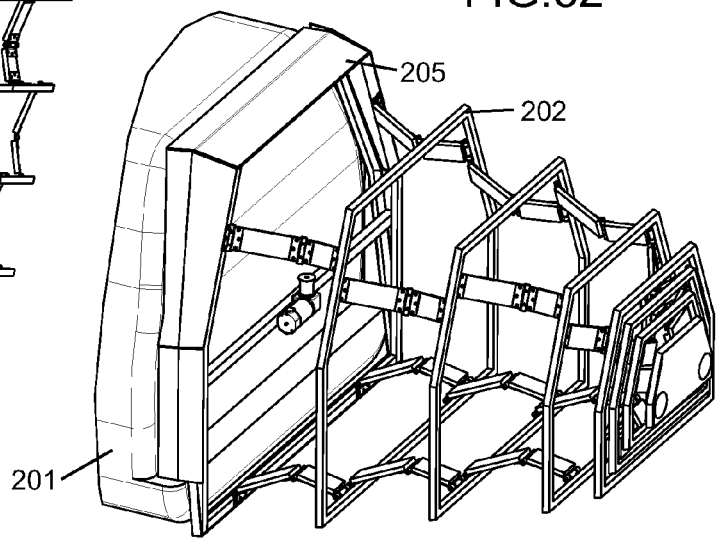
Figure 30:
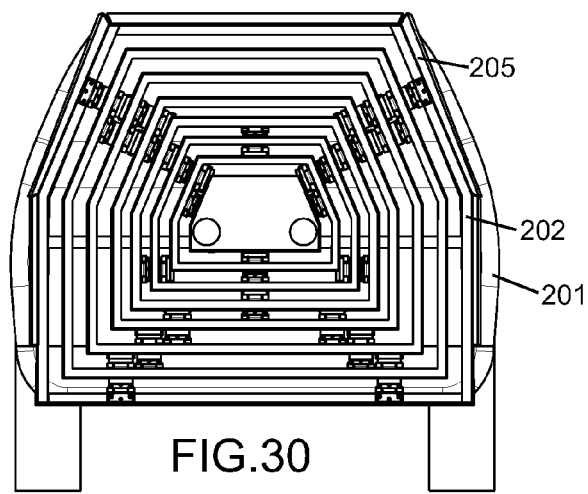

When extended, drag reducing devices in accordance with the present disclosure are typically truncated (see FIGS. 2, 25, and 41). In certain truncated embodiments, the extended lengths of the drag reducing devices are such that the effects of drag caused by air flow separation at the truncated ends are minimal. In example embodiments suitable for over-the-road trailers 101, the drag reducing devices may have extended lengths, L, greater than or equal to 4 feet, or in the range of 4 to 22 feet, or in the range of 8-14 feet. Vehicles having smaller heights and widths could be equipped with proportionally smaller drag reduction devices. In certain embodiments, the ratio of the extended length, L, of the drag reduction device to a reference dimension of the vehicle is at least 1 to 1. The reference dimension is typically the smaller of the width, w, or the height, h, of the rear of the vehicle body. In the embodiment of FIG. 2, the width, w, is the reference dimension since it is smaller than the height, h. In other embodiments, this ratio is at least 1.5 to 1, or at least 2 to 1, or at least 3 to 1.

In certain embodiments, drag reducing devices in accordance with the present disclosure may be automatically extended or retracted. A control system may be used to automatically control extension and retraction. In certain embodiments, vehicle speed, crosswind speed, and/or other vehicle parameters may be used to automatically control retraction/extension. For example, a controller may sense vehicle speed, and automatically cause refraction of the drag reducing device if the vehicle speed moves below a given speed value (e.g., 45 miles per hour). In another example, a controller may sense crosswind speed, and automatically cause retraction if crosswinds exceed a given value (e.g., 25 miles per hour). Wireless (e.g., radio wave) communication may be used to transmit and receive control system communication and information.

Figure 33:
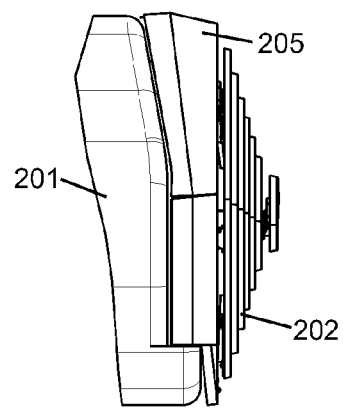
Figure 38:
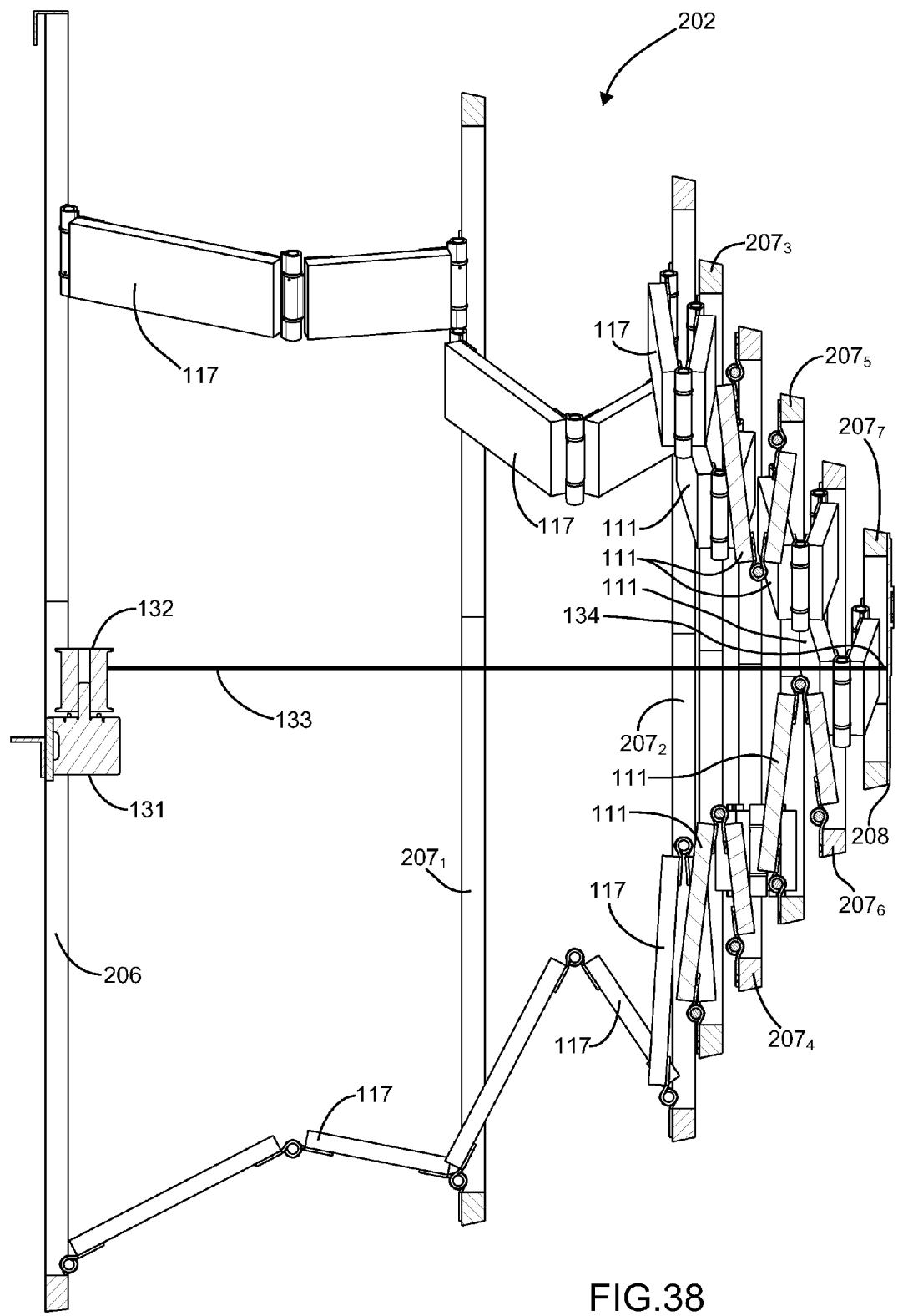

Retractable drag reducing devices in accordance with the present disclosure can have relatively long extended lengths, L, (see FIG. 26) as compared to retracted lengths (see FIG. 33). Certain embodiments have an extended length, L, to retracted length ratio of at least 6 to 1. Other embodiments have extended length to retracted length ratios of at least 10 to 1 or at least 20 to 1.

While specific angles and lengths have been specified for certain embodiments of the present disclosure, it will be appreciated that the broad aspects of the present disclosure are not limited to these values.

The use of subscripts in item numbers in this disclosure typically implies a specific member of a group of related items. The use of the same number without the subscript typically implies a generic member or typical member of the group of related items.

In the present disclosure, the words "a" or "an" are to be taken to include both the singular and the plural. Conversely, any references to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

The invention claimed is:

1. A drag reducing device for use in reducing drag on vehicles, the drag reducing device comprising:
    a drag reducing assembly that is movable along a longitudinal axis between an extended configuration and a retracted configuration, the drag reducing assembly including a first end adapted for connection to the vehicle and a second end that is moved outwardly from the first end when the drag reducing assembly is moved from the retracted configuration toward the extended configuration;
    the drag reducing assembly at least partially defining an extended volume when the drag reducing assembly is in the extended configuration, a flexible material at least partially defining an exterior of the extended volume; and
    the drag reducing assembly including a linkage for extending and retracting the drag reducing assembly;
    wherein at least a portion of the flexible material is urged toward the longitudinal axis by the linkage when the drag reducing assembly is moved from the extended configuration toward the retracted configuration.

2. The drag reducing device of claim 1, wherein the linkage includes a scissors linkage.

3. The drag reducing device of claim 1, wherein the flexible material is a flexible fabric material.

4. The drag reducing device of claim 1, wherein the flexible material substantially extends between the first end and the second end of the drag reducing assembly.

5. The drag reducing device of claim 1, wherein the flexible material is attached to an attachment frame of the drag reducing assembly.

6. The drag reducing device of claim 1, wherein the flexible material is attached to an adapter fairing of the drag reducing assembly.

7. The drag reducing device of claim 1, wherein the flexible material is moved toward the longitudinal axis by at least one element connected between the linkage and the flexible material.

8. The drag reducing device of claim 7, wherein the at least one element is at least one elastic element.

9. The drag reducing device of claim 7, wherein the at least one element extends between a first end connected to the linkage and a second end connected to the flexible material.

10. The drag reducing device of claim 1, wherein the extended volume is open at the second end of the drag reducing assembly.

11. A drag reducing device for use in reducing drag on a vehicle, the drag reducing device configurable in an extended configuration and a retracted configuration, the drag reducing device comprising:
   a flexible material at least partially defining an exterior of the drag reducing device at least when the drag reducing device is at the extended configuration;
   a frame at least partially supporting at least a portion of the flexible material at least when the drag reducing device is at the extended configuration; and
   a linkage including at least a first link and a second link, the linkage at least partially supporting at least a portion of the frame at least when the drag reducing device is at the extended configuration;
   wherein at least a portion of the flexible material is urged inwardly toward a longitudinal axis by the linkage at least when the drag reducing device is reconfigured from the extended configuration to the retracted configuration.

12. The drag reducing device of claim 11, further comprising:
   a first end adapted for connection to the vehicle and a second end that is moved outwardly from the first end when the drag reducing device is reconfigured from the retracted configuration to the extended configuration.

13. The drag reducing device of claim 11, further comprising at least one element connected between the linkage and the flexible material, wherein the flexible material is urged inwardly by the linkage via the at least one element.

14. The drag reducing device of claim 13, wherein the at least one element is at least one elastic element.

15. The drag reducing device of claim 13, wherein the first link is connected to the second link at a joint and wherein the at least one element is connected to the linkage at the joint.

16. The drag reducing device of claim 15, wherein the joint moves inwardly when the drag reducing device is reconfigured from the extended configuration to the retracted configuration and thereby moves the at least one element inwardly and thereby urges the flexible material inwardly.

17. The drag reducing device of claim 11, further comprising:
   a second frame at least partially supporting at least a portion of the flexible material at least when the drag reducing device is at the extended configuration, wherein the frame is a first frame; and
   a second linkage including at least a third link and a fourth link, the second linkage at least partially supporting at least a portion of the second frame and at least a portion of the first frame at least when the drag reducing device is at the extended configuration, wherein the linkage is a first linkage.

18. The drag reducing device of claim 11, wherein the flexible material substantially defines the exterior of the drag reducing device at least when the drag reducing device is at the extended configuration.

19. A drag reducing device for use in reducing drag on a vehicle, the drag reducing device configurable at a deployed configuration and a stowed configuration, the drag reducing device comprising:
   a flexible material at least partially defining an exterior of the drag reducing device at least when the drag reducing device is at the deployed configuration; and
   a linkage at least partially supporting at least a portion of the flexible material at least when the drag reducing device is at the deployed configuration and also inwardly urging at least a portion of the flexible material toward a longitudinal axis at least when the drag reducing device is configured at the stowed configuration.

20. The drag reducing device of claim 19, further comprising at least one element connected between the linkage and the flexible material, wherein the flexible material is urged inwardly by the linkage via the at least one element at least when the drag reducing device is configured at the stowed configuration.

* * * * *